United States Patent
Finn et al.

(10) Patent No.: US 11,383,139 B2
(45) Date of Patent: Jul. 12, 2022

(54) GOLF CLUB HEAD OR OTHER BALL STRIKING DEVICE WITH WEIGHTED BODY MEMBER

(71) Applicant: KARSTEN MANUFACTURING CORPORATION, Phoenix, AZ (US)

(72) Inventors: Michael E. Finn, Forth Worth, TX (US); David N. Franklin, Granbury, TX (US); Raymond J. Sander, Benbrook, TX (US); Jeremy N. Snyder, Benbrook, TX (US); Robert M. Boyd, Double Oak, TX (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 17/068,726

(22) Filed: Oct. 12, 2020

(65) Prior Publication Data
US 2021/0023423 A1    Jan. 28, 2021

Related U.S. Application Data

(63) Continuation of application No. 16/513,551, filed on Jul. 16, 2019, now Pat. No. 10,799,777, which is a
(Continued)

(51) Int. Cl.
*A63B 53/04*    (2015.01)
*B29C 45/16*    (2006.01)
(Continued)

(52) U.S. Cl.
CPC ........ *A63B 53/047* (2013.01); *A63B 53/0475* (2013.01); *B29C 45/1671* (2013.01);
(Continued)

(58) Field of Classification Search
CPC ........ A63B 53/0416; A63B 2053/0491; A63B 53/047; A63B 53/0475; A63B 53/0408;
(Continued)

(56) References Cited

U.S. PATENT DOCUMENTS 5,509,660 A * 4/1996 Elmer ................. A63B 53/04
473/288
5,522,593 A * 6/1996 Kobayashi .......... A63B 53/04
473/349

(Continued)

*Primary Examiner* — Benjamin Layno

(57) ABSTRACT

A ball striking device, such as a golf club, includes a head that includes a face having a ball striking surface configured for striking a ball and a body connected to the face and extending rearward from the face. A face member formed primarily of a metallic material forms the face, and a body member is connected to the face member and extends rearward from the face member to form at least a portion of the body. The body member is formed at least partially of a polymer material, and has a doped portion containing a doping material dispersed within the polymer material. The doping material may have a different density than the polymer material, such that the doped portion has a different density than the portions of the body member not containing the doping material. A co-molding method may be used to form the ball striking device.

15 Claims, 24 Drawing Sheets

Related U.S. Application Data continuation of application No. 15/983,001, filed on May 17, 2018, now Pat. No. 10,369,432, which is a continuation of application No. 15/493,507, filed on Apr. 21, 2017, now Pat. No. 9,993,702, which is a continuation of application No. 14/621,762, filed on Feb. 13, 2015, now Pat. No. 9,630,072, which is a continuation of application No. 13/485,329, filed on May 31, 2012, now Pat. No. 8,968,114.

(51) Int. Cl.
*B29L 31/52* (2006.01)
*B29C 45/14* (2006.01)
*B29C 45/00* (2006.01)
*A63B 53/00* (2015.01)

(52) U.S. Cl.
CPC ............ *A63B 53/005* (2020.08); *A63B 53/04* (2013.01); *A63B 53/042* (2020.08); *A63B 53/0408* (2020.08); *A63B 53/0416* (2020.08); *A63B 53/0433* (2020.08); *A63B 53/0437* (2020.08); *A63B 53/0466* (2013.01); *A63B 53/0487* (2013.01); *A63B 2053/0491* (2013.01); *A63B 2209/00* (2013.01); *A63B 2209/02* (2013.01); *B29C 45/0013* (2013.01); *B29C 45/14336* (2013.01); *B29L 2031/5227* (2013.01)

(58) Field of Classification Search
CPC .. A63B 2209/00; A63B 2209/02; A63B 53/04
USPC ................. 473/345, 346, 347, 349, 350
See application file for complete search history.

(56) References Cited

U.S. PATENT DOCUMENTS

| | | |
|---|---|---|
| 8,409,022 B2 | 4/2013 | Oldknow et al. |
| 8,435,135 B2 | 5/2013 | Stites et al. |
| 8,777,776 B2 | 7/2014 | Wahl et al. |
| 8,968,114 B2 | 3/2015 | Boyd et al. |
| 9,630,072 B2 | 4/2017 | Finn et al. |
| 9,993,702 B2 | 6/2018 | Finn et al. |
| 10,369,432 B2 | 8/2019 | Finn et al. |
| 2006/0199661 A1 | 9/2006 | Deng et al. |
| 2008/0125245 A1 | 5/2008 | Yang et al. |
| 2011/0070963 A1 | 3/2011 | Fedorochko |
| 2011/0275452 A1 | 11/2011 | Finn |
| 2012/0135821 A1 | 5/2012 | Boyd et al. |
| 2013/0090182 A1 | 4/2013 | Sander et al. |
| 2014/0038747 A1* | 2/2014 | Dolezel ............. A63B 60/54 473/342 |

* cited by examiner

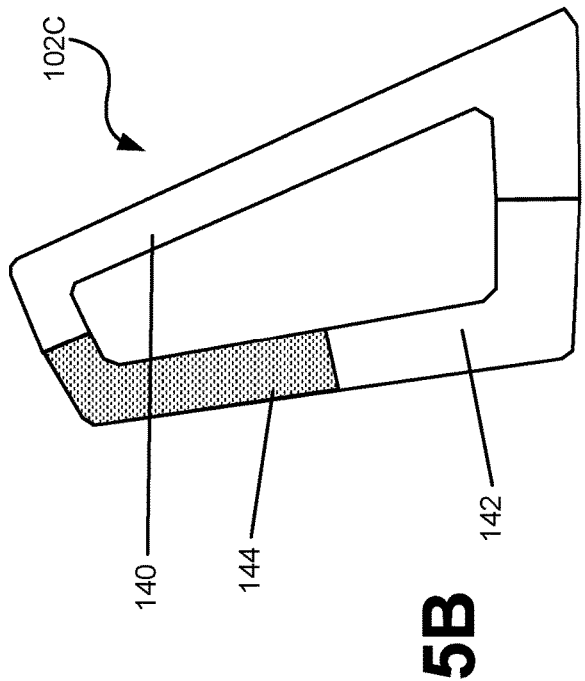
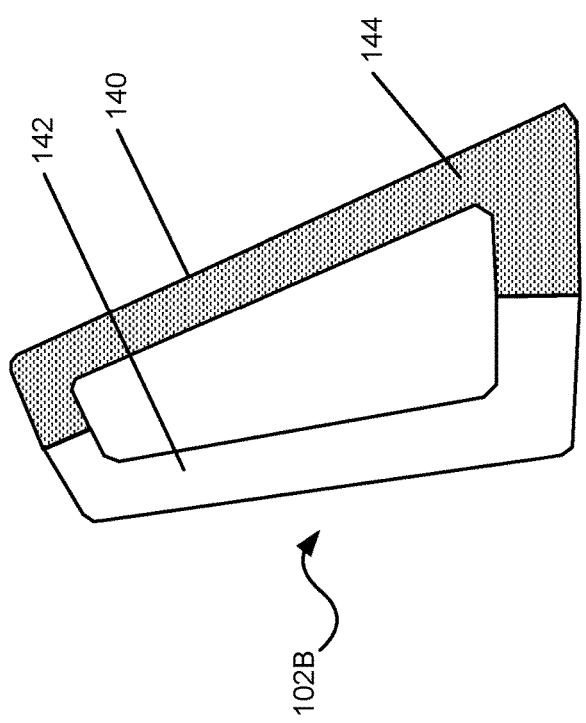
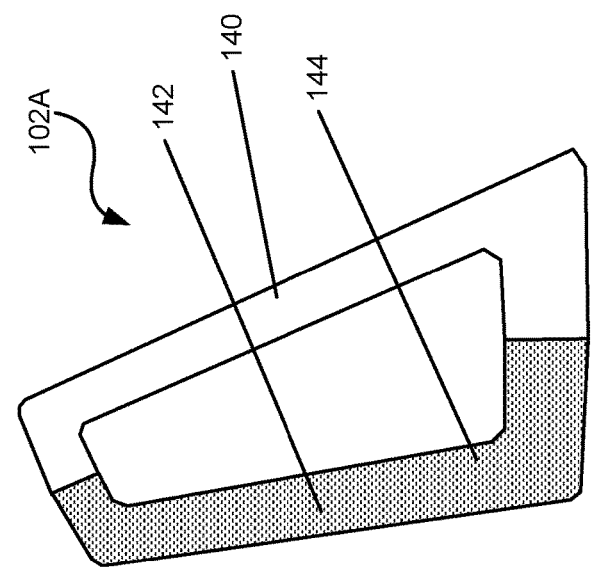
FIG. 5A
FIG. 5B
FIG. 5C

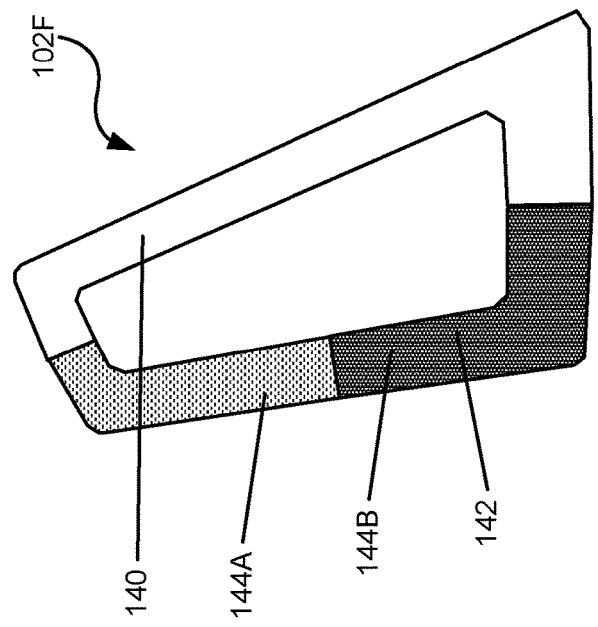
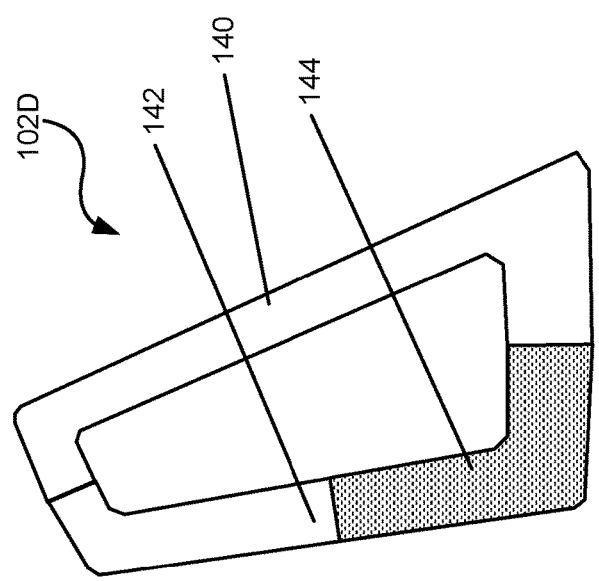
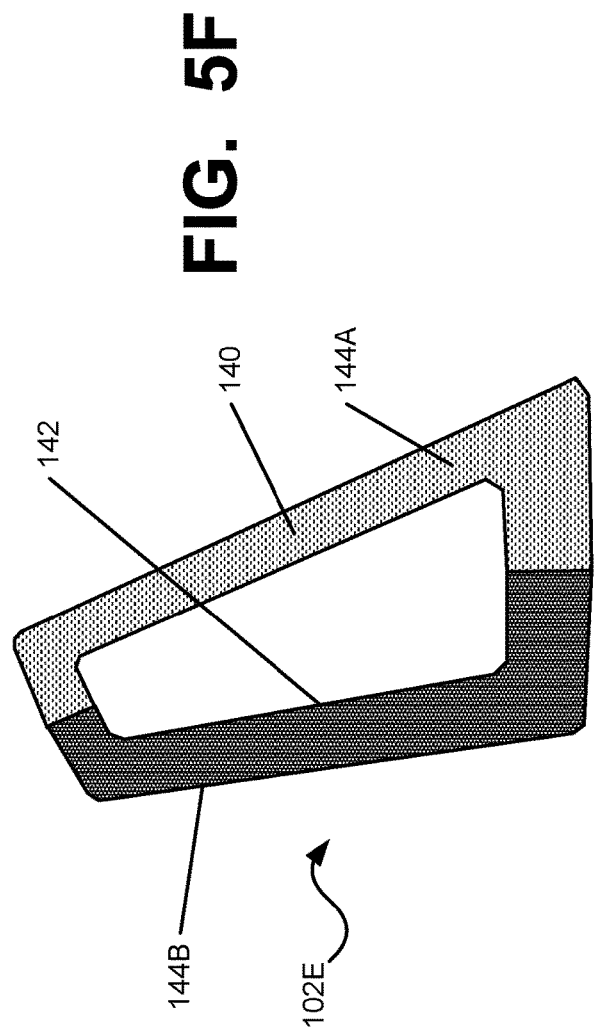
FIG. 5D
FIG. 5E
FIG. 5F

GOLF CLUB HEAD OR OTHER BALL STRIKING DEVICE WITH WEIGHTED BODY MEMBER

CROSS-REFERENCE TO RELATED APPLICATION

This is a continuation of U.S. patent application Ser. No. 16/513,551, now U.S. Pat. No. 10,799,777, filed on Jul. 16, 2019, which is a continuation of U.S. patent application Ser. No. 15/983,001, now U.S. Pat. No. 10,369,432, filed May 17, 2018, which is a continuation of U.S. patent application Ser. No. 15/493,507, now U.S. Pat. No. 9,993,702, filed Apr. 21, 2017, which is a continuation of U.S. patent application Ser. No. 14/621,762, now U.S. Pat. No. 9,630,072, filed Feb. 13, 2015, which is a continuation of U.S. patent application Ser. No. 13/485,329, now U.S. Pat. No. 8,968,114, filed May 31, 2012. This application claims priority to and the benefit of all of the above listed applications, which are incorporated by reference herein in their entirety.

TECHNICAL FIELD

The invention relates generally to ball striking devices, such as golf clubs and heads. Certain aspects of this invention relate to golf clubs and golf club heads having a body member connected to a face member, with the body member having strategic weighting.

BACKGROUND

Golf is enjoyed by a wide variety of players—players of different genders, and players of dramatically different ages and skill levels. Golf is somewhat unique in the sporting world in that such diverse collections of players can play together in golf outings or events, even in direct competition with one another (e.g., using handicapped scoring, different tee boxes, etc.), and still enjoy the golf outing or competition. These factors, together with increased golf programming on television (e.g., golf tournaments, golf news, golf history, and/or other golf programming) and the rise of well known golf superstars, at least in part, have increased golfs popularity in recent years, both in the United States and across the world.

Golfers at all skill levels seek to improve their performance, lower their golf scores, and reach that next performance "level." Manufacturers of all types of golf equipment have responded to these demands, and recent years have seen dramatic changes and improvements in golf equipment. For example, a wide range of different golf ball models now are available, with some balls designed to fly farther and straighter, provide higher or flatter trajectory, provide more spin, control, and feel (particularly around the greens), etc.

Being the sole instrument that sets a golf ball in motion during play, the golf club also has been the subject of much technological research and advancement in recent years. For example, the market has seen improvements in golf club heads, shafts, and grips in recent years. Additionally, other technological advancements have been made in an effort to better match the various elements of the golf club and characteristics of a golf ball to a particular user's swing features or characteristics (e.g., club fitting technology, ball launch angle measurement technology, etc.).

Despite the various technological improvements, golf remains a difficult game to play at a high level. For a golf ball to reliably fly straight and in the desired direction, a golf club should meet the golf ball square (or substantially square) to the desired target path. Moreover, the golf club should meet the golf ball at or close to a desired location on the club head face (i.e., on or near a "desired" or "optimal" ball contact location) to reliably fly straight, in the desired direction, and for a desired distance. Off-center hits that deviate from squared contact and/or are located away from the club's desired ball contact location may tend to "twist" the club face when it contacts the ball, thereby sending the ball in the wrong direction, often imparting undesired hook or slice spin, and/or robbing the shot of distance. Accordingly, club head features that can help a user keep the club face square with the ball, such as by reducing twisting, would tend to help the ball fly straighter and truer, in the desired direction, and often with improved and/or more reliable distance.

Various golf club heads have been designed to improve a golfer's accuracy by assisting the golfer in squaring the club head face at impact with a golf ball. When the club face is not square at the point of engagement, the golf ball may fly in an unintended direction, may follow a route that curves left or right, ball flights that are often referred to as "pulls," "pushes," "draws," "fades," "hooks," or "slices," and/or may exhibit more boring or climbing trajectories. The distance and direction of ball flight can also be significantly affected by the spin imparted to the ball by the impact with the club head. Additionally, the spin of the ball can change the behavior of the ball as it rolls and bounces after impact with the ground. Various speeds and directions of spin on the ball can be a product of many factors, including the point of impact, the direction of the club head upon impact, the degree of twisting of the club head upon impact, and the location of the center of gravity of the club head.

The energy and velocity transferred to the ball by a golf club also may be related, at least in part, to the flexibility of the club face at the point of contact, and can be expressed using a measurement called "coefficient of restitution" (or "COR"). The maximum COR for golf club heads is currently limited by the USGA at 0.83. Generally, a club head will have an area of highest COR response relative to other areas of the face, which imparts the greatest energy and velocity to the ball, and this area is typically positioned at or near the geometric center of the face. In one example, the area of highest response may have a COR that is equal to the prevailing USGA limit which is currently 0.83 and may change over time. However, because golf clubs are typically designed to contact the ball at or around the center of the face, off-center hits may result in less energy being transferred to the ball, decreasing the distance of the shot.

The weighting and weight distribution of a golf club head may also influence the energy and velocity transferred to the ball by the impact, as well as the moment of inertia and the center of gravity of the club head. The moment of inertia of the head can be increased, for example, by distributing a greater amount of weight around the perimeter of the head. This, in turn, can reduce the amount of twisting of the club head that occurs on off-center hits, and increase the distance and accuracy of shots on off-center hits. Likewise, the location of the center of gravity of the head can be influenced by the weight distribution of the head. Generally, the desired contact area of the face is aligned with the center of gravity of the head. However, it may be desirable to shift the location of the center of gravity of the head, such as to adjust for common off-center hitting patterns by a golfer, or to produce a certain shot characteristic (e.g., to induce a hook, slice, draw, fade, etc.). Additionally, different clubs having different loft angles can benefit from different weighting, such as a set of iron-type golf clubs having different centers of gravity. For example, a center of gravity that is lower and/or farther backward can produce higher loft and lower spin on the shot, while a center of gravity that is higher and/or farther forward may produce lower loft, greater distance, and higher spin on the shot and/or greater control, each of which may be desirable in certain clubs or for certain golfers. Accordingly, club head features that can permit the weighting and weight distribution of the head to be adjusted or customized may provide improved performance in several ways.

The present device and method are provided to address the problems discussed above and other problems, and to provide advantages and aspects not provided by prior ball striking devices of this type. A full discussion of the features and advantages of the present invention is deferred to the following detailed description, which proceeds with reference to the accompanying drawings.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the invention relate to ball striking devices, such as golf clubs, with a head that includes a face having a ball striking surface configured for striking a ball and a body connected to the face and extending rearward from the face. A face member forms the face, and a body member is connected to the face member and extends rearward from the face member to form at least a portion of the body. The body member and/or the face member is formed at least partially of a polymer material, and has a doped portion containing a doping material dispersed within the polymer material. The doping material may have a different density than the polymer material, such that the doped portion has a different density than the portions of the head not containing the doping material. The face member may be formed primarily of a metallic material in one embodiment. Additionally, the head may be completely or partially coated with a particulate metallic nano-coating material.

According to one aspect, the polymer material of the body member includes at least one of the following materials: acrylonitrile butadiene styrene, polyamide alloys, high density polyethylene (HDPE), styrene ethylene butylene styrene block copolymer, thermoplastic polyurethane, other polyurethanes, rubber materials, silicones, and other polymers and copolymers, and combinations thereof. The doping material includes at least one of the following particulate materials: tungsten, stainless steel, brass, copper, lead, etc., as well as non-metals such as various oxides, sulfates, etc. and combinations thereof, or any other material or combination of such materials having one or more desired properties, According to another aspect, the body member further may comprise a fiber reinforcing material engaged with the polymer material and reinforcing the polymer material.

According to a further aspect, the face member can be connected to the body member in many different configurations. In one embodiment, the face member and the body member may have complementary mating structures connecting the face member to the body member. For example, one of the face member and the body member may have a projection and the other may have a receiver that receives the projection to connect the face member to the body member. The face member and the body member may have a dovetail mating structure, with appropriate projection(s) and recess(es). The projection may be a ridge extending around at least a portion of the periphery of the face member, and the recess may be a complementarily-shaped channel extending around at least a portion of the periphery of the body member. A bonding material (e.g., adhesives, cements, etc.) may additionally or alternately be used.

According to yet another aspect, the face member and the body member are connected by forming the body member in connection to the face member in a co-molding process.

According to a still further aspect, the body member has a plurality of doped portions, each containing the doping material dispersed within the polymer material, and the doped portions are positioned in different locations.

Additional aspects of the invention relate to an iron-type golf club head that includes a face member forming an iron-type face defined by a plurality of peripheral edges and having a ball striking surface configured for striking a ball, and a body member connected to the rear surface of the face member and extending rearward from the face member, with the body member forming at least a portion of an iron-type body extending rearwardly from the peripheral edges of the face. The face member is formed primarily of a metallic material, and the body member is formed at least partially of a polymer material. The body member has a doped portion containing a doping material dispersed within the polymer material. The doping material has a different density than the polymer material, such that the doped portion has a different density than the portions of the body member not containing the doping material. Any aspects described above also may be incorporated into this club head structure.

According to another aspect, the face member is joined to the body member around at least a portion of a periphery of the face member.

Further aspects of the invention relate to a set of iron-type golf clubs that includes six iron-type golf clubs, each having an iron-type golf club head that includes a face defined by a plurality of peripheral edges, with the face having a ball striking surface configured for striking a ball and an inner surface opposite the ball striking surface, and a body connected to the face and extending rearward from the peripheral edges of the face. The body is formed at least partially of a polymeric material having a doped portion containing a doping material dispersed within the polymer material. The doping material has a different density than the polymer material, such that the doped portion has a different density than a portion of the body not containing the doping material. The six golf clubs have different loft angles that increase in a sequence, such that the loft angle of each of the golf clubs is about 5° greater than a previous golf club in the sequence. Such a set of clubs may also include one or more clubs of a different type, such as one or more wood-type clubs.

According to one aspect, the six golf clubs include a first club having a loft angle of about 20°, a second club having a loft angle of about 25°, a third club having a loft angle of about 30°, a fourth club having a loft angle of about 35°, a fifth club having a loft angle of about 40°, and a sixth club having a loft angle of about 45°.

According to another aspect, the set further includes a seventh club, such as a pitching wedge having a loft angle of about 50°, a gap wedge having a loft of about 55°, a lob wedge having a loft of about 60° or 65°, or another wedge or longer iron club.

According to a further aspect, the set of golf clubs may have differently or progressively weighted heads. For example, at least one of the six golf club heads has the doped portion located in a different location relative to the doped portion of at least one other of the six golf club heads. As another example, each of the six golf club heads has the doped portion located in a different location relative to the doped portions of each of the others of the six golf club heads. A set of differently-weighted clubs may be progressively weighted, such as by progressively moving the center of gravity of the club head top-to-bottom and/or heel-to-toe as the clubs become progressively longer or shorter.

Still further aspects of the invention relate to methods that may be used in connection with a provided face member formed primarily of a metallic material. The face member forms a golf club face defined by a plurality of peripheral edges and having a ball striking surface configured for striking a ball and a rear surface located rearwardly from the ball striking surface. The face member is positioned in communication with a tool, such that at least a portion of the rear surface of the face member is in communication with the tool. Then, a polymer material is introduced into contact with the tool such that the polymer material contacts at least a portion of the tool and contacts the rear surface of the face member. The polymer material forms a body member connected to the rear surface of the face member when the polymer material hardens or solidifies. The face member and the body member combine to form a golf club head comprising the face and a body extending rearwardly from the face. Such methods may be considered co-molding methods.

According to one aspect, the tool is a mold having a mold cavity. The polymer material is introduced into the mold cavity such that the polymer material fills at least a portion of the mold cavity and contacts the rear surface of the face member. The polymer material may be introduced into the mold cavity by injection of the polymer material in flowable form. In one example, the polymer material forms around an interior surface of the mold cavity and is spaced from at least a portion of the rear surface of the face member, such that the face member and the body member combine to define an interior cavity within the club head.

According to another aspect, a doping material is positioned proximate the tool prior to introducing the polymer material into contact with the tool, such that the doping material becomes embedded within the polymer material when the polymer material is introduced into contact with the tool. The doping material has a different density than the polymer material, such that the doped portion has a different density than the portions of the body member not containing the doping material.

According to a further aspect, the face member has a mating structure and the polymer material forms the body member with complementary mating structure. The mating structure may include a projection on the face member, such that the polymer material forms around the projection to form a receiver that receives the projection to connect the face member to the body member. In one example, the face member has a dovetail mating structure and the body member has a complementary dovetail mating structure.

According to yet another aspect, a fiber reinforcing material is positioned proximate the tool prior to introducing the polymer material into contact with the tool, such that the fiber reinforcing material becomes embedded within the polymer material when the polymer material is introduced into contact with the tool.

According to a still further aspect, the polymer material contains a fiber reinforcing material that is introduced into contact with the tool along with the polymer material, such that the fiber reinforcing material is embedded within the polymer material after the polymer material forms the body member. In one example, the polymer material and the fiber reinforcing material may be formed together as a prepreg. In this configuration, the polymer material and the fiber reinforcing material can be introduced into contact with the tool by placing the prepreg into contact with the tool. In another example, the polymer material may be in flowable form and the fiber reinforcing material may be particles dispersed throughout the flowable material. In this configuration, the polymer material and the fiber reinforcing material can be introduced into contact with the tool by injecting the polymer material into contact with the tool along with the dispersed fiber reinforcing material.

Other aspects of the invention relate to golf clubs that include a golf club head as described above and a shaft connected to the head, or a set of golf clubs including at least one golf club having a head as described above.

Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which:

FIG. 5A-5I show illustrative embodiments of iron-type ball striking heads as illustrated in FIG. 4, having doped portions positioned in different locations;

DETAILED DESCRIPTION

Figure 1:
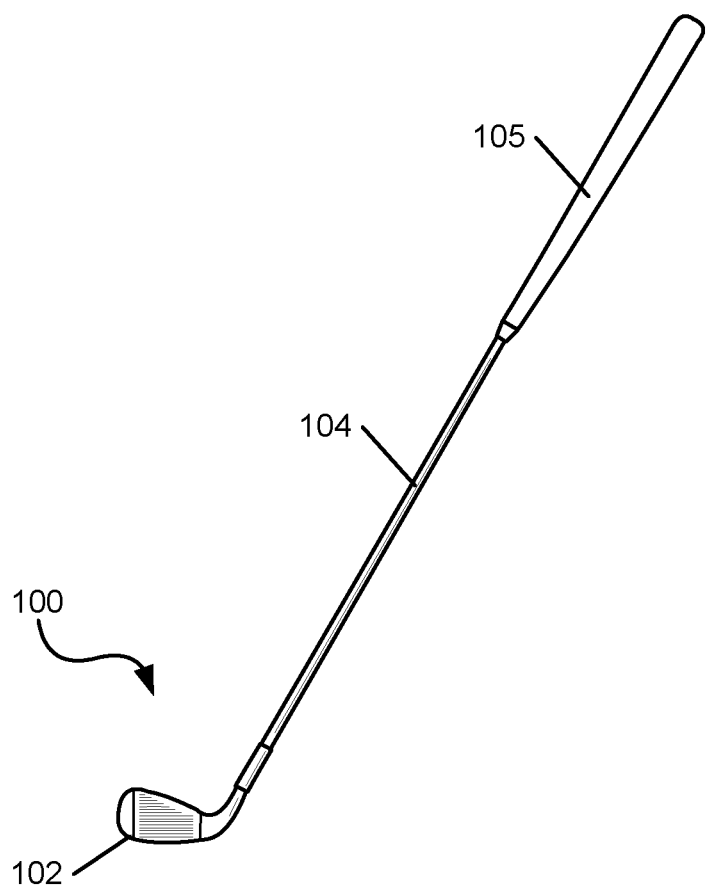
FIG. 1 is a front view of an illustrative embodiment of an iron-type ball striking device according to aspects of the present invention.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Ball striking device" means any device constructed and designed to strike a ball or other similar objects (such as a hockey puck). In addition to generically encompassing "ball striking heads," which are described in more detail below, examples of "ball striking devices" include, but are not limited to: golf clubs, putters, croquet mallets, polo mallets, baseball or softball bats, cricket bats, tennis rackets, badminton rackets, field hockey sticks, ice hockey sticks, and the like.

"Ball striking head" means the portion of a "ball striking device" that includes and is located immediately adjacent (optionally surrounding) the portion of the ball striking device designed to contact the ball (or other object) in use. In some examples, such as many golf clubs and putters, the ball striking head may be a separate and independent entity from any shaft or handle member, and it may be attached to the shaft or handle in some manner.

The terms "shaft" and "handle" are used synonymously and interchangeably in this specification, and they include the portion of a ball striking device (if any) that the user holds during a swing of a ball striking device.

"Integral joining technique" means a technique for joining two or more pieces so that the pieces effectively become a single, integral piece, including, but not limited to, irreversible joining techniques, such as adhesively joining, cementing, and welding (including brazing, soldering, or the like), where separation of the joined pieces cannot be accomplished easily and/or without structural damage to at least one of the pieces.

In general, aspects of this invention relate to ball striking devices, such as golf club heads, golf clubs, putter heads, putters, and the like. Such ball striking devices, according to at least some examples of the invention, may include a ball striking head and a ball striking surface. In the case of a golf club, the ball striking surface is a substantially flat surface on one face of the ball striking head (although, in some structures, the face may include some curvature, e.g., known as "bulge" and/or "roll"). Some more specific aspects of this invention relate to iron-type golf clubs and golf club heads, including long irons, short irons, wedges, etc. Alternately, some aspects of this invention may be practiced with hybrid clubs, chippers, and the like, or wood-type golf clubs and the like.

According to various aspects of this invention, the ball striking device may be formed of one or more of a variety of materials, such as metals (including metal alloys), ceramics, polymers, composites (including fiber-reinforced composites), and wood, and may be formed in one of a variety of configurations, without departing from the scope of the invention. In one illustrative embodiment, some or all components of the head, including the face and at least a portion of the body of the head, are made of metal. It is understood that the head may contain components made of several different materials, including carbon-fiber and other components. Additionally, the components may be formed by various forming methods. For example, metal components (such as titanium, aluminum, titanium alloys, aluminum alloys, steels (including stainless steels), and the like) may be formed by forging, molding, casting, stamping, machining, and/or other known techniques. In another example, composite components, such as carbon fiber-polymer composites, can be manufactured by a variety of composite processing techniques, such as prepreg processing, powder-based techniques, mold infiltration, and/or other known techniques.

The various figures in this application illustrate examples of ball striking devices according to this invention. When the same reference number appears in more than one drawing, that reference number is used consistently in this specification and the drawings refer to the same or similar parts throughout.

At least some examples of ball striking devices according to this invention relate to golf club head structures, including heads for wood-type golf clubs, such as drivers, as well as long iron clubs (e.g., driving irons, zero irons through five irons), short iron clubs (e.g., six irons through pitching wedges, as well as sand wedges, lob wedges, gap wedges, and/or other wedges), hybrid clubs, and putters. Such devices may include a one-piece construction or a multiple-piece construction. Example structures of ball striking devices according to this invention will be described in detail below in conjunction with FIG. 1, which illustrates an example of a ball striking device 100 in the form of an iron-type golf club, in accordance with at least some examples of this invention.

FIG. 1 illustrates a ball striking device 100 in the form of a golf iron, in accordance with at least some examples of this invention, and illustrative embodiments of heads 102, et seq., of ball striking devices 100 of this type and methods of making them are shown in FIGS. 2-15. The golf club head 102 of FIG. 1 may be representative of any iron-type golf club head in accordance with examples of the present invention. As shown in FIGS. 1-4, the ball striking device 100 includes a ball striking head 102 and a shaft 104 connected to the ball striking head 102 and extending therefrom. The ball striking head 102 of the ball striking device 100 of FIGS. 1-2 has a face 112 connected to a body 108, with a hosel 109 extending therefrom. Any desired hosel and/or head/shaft interconnection structure may be used without departing from this invention, including conventional hosel or other head/shaft interconnection structures as are known and used in the art, or an adjustable, releasable, and/or interchangeable hosel or other head/shaft interconnection structure such as those shown and described in U.S. Pat. No. 6,890,269 dated May 10, 2005, in the name of Bruce D. Burrows, U.S. Published Patent Application No. 2009/0011848, filed on Jul. 6, 2007, in the name of John Thomas Stites, et al., U.S. Published Patent Application No. 2009/0011849, filed on Jul. 6, 2007, in the name of John Thomas Stites, et al., U.S. Published Patent Application No. 2009/0011850, filed on Jul. 6, 2007, in the name of John Thomas Stites, et al., and U.S. Published Patent Application No. 2009/0062029, filed on Aug. 28, 2007, in the name of John Thomas Stites, et al., all of which are incorporated herein by reference in their entireties.

Figure 2:
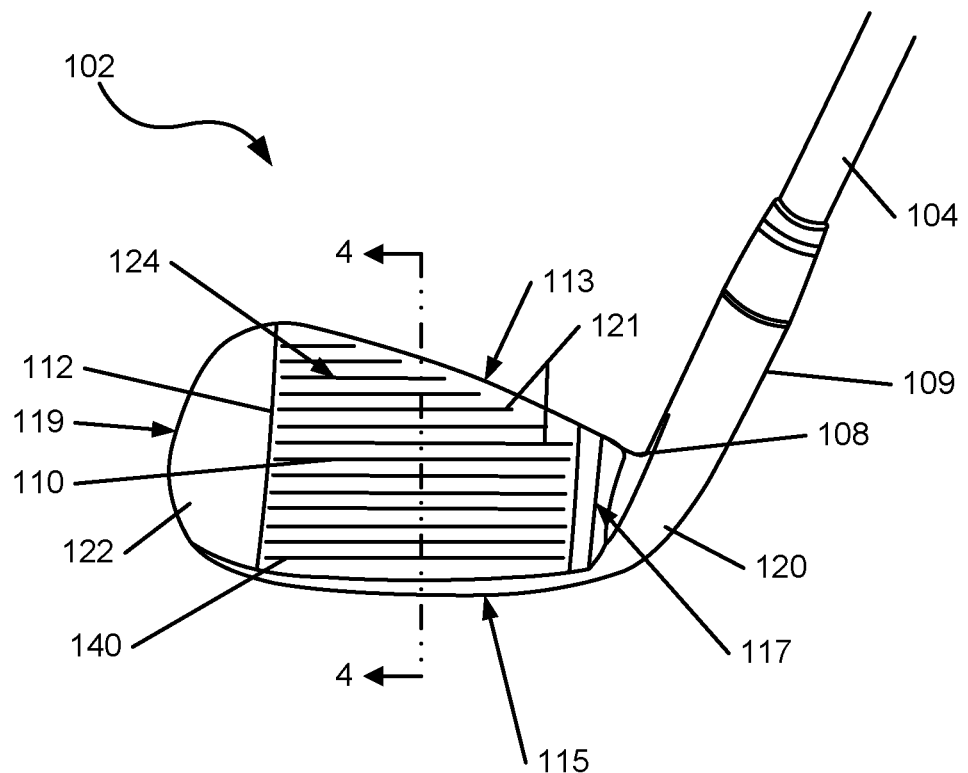
FIG. 2 is a front view of an illustrative embodiment of a head of the ball striking device of FIG. 1.
Figure 3:
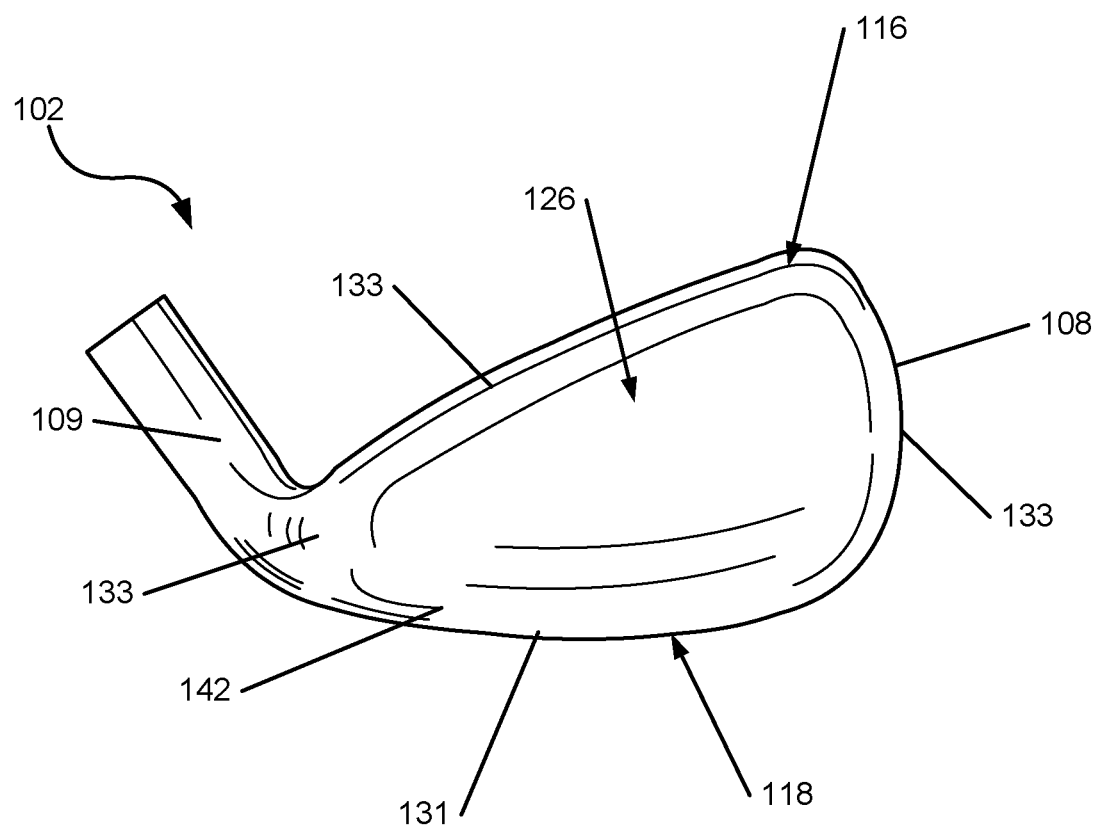
FIG. 3 is a rear view of the head of FIG. 2.
Figure 4:
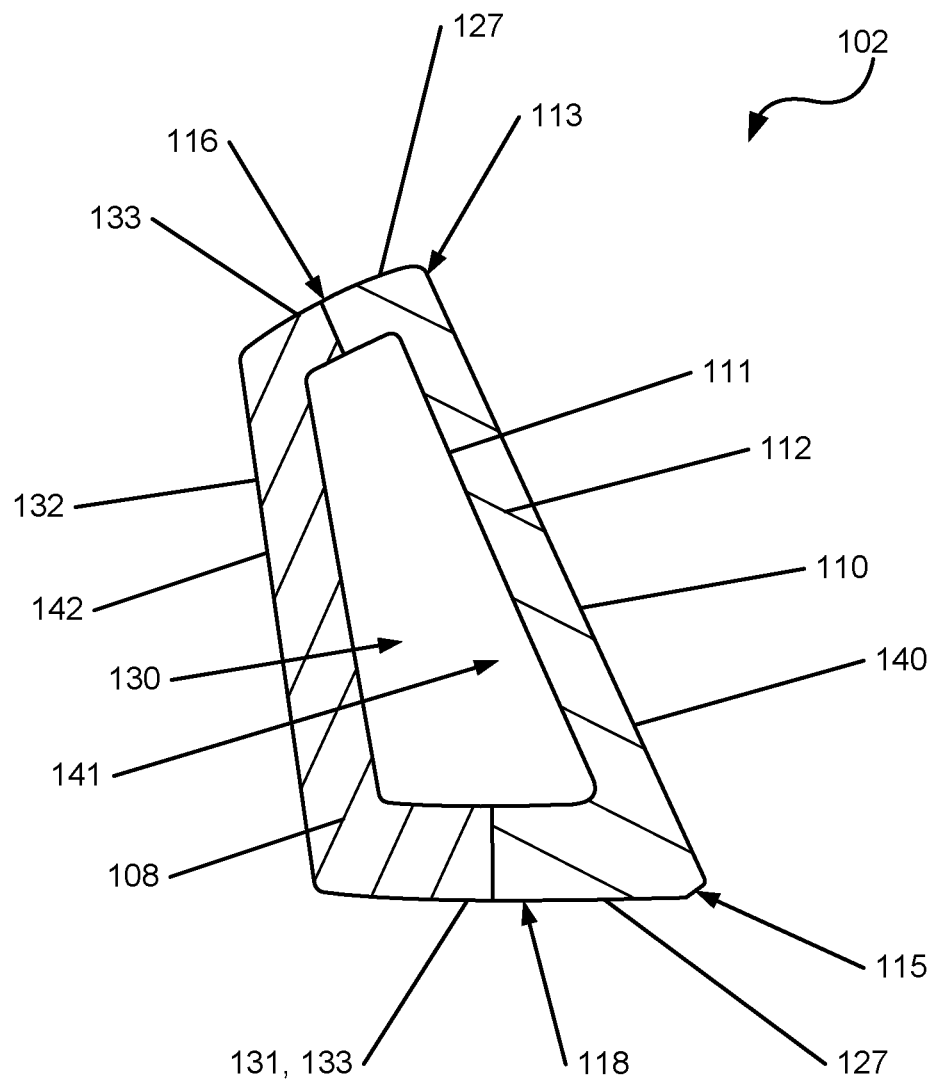
FIG. 4 is a cross-section view of the head of FIG. 2, taken along lines 4-4 of FIG. 2.

As shown in FIGS. 2-4, the golf club head 102 includes a body member 108, a face 112, and a hosel 109 extending from the body 108 for attachment of the shaft 104. For reference, the head 102 generally has a top 116, a bottom or sole 118, a heel 120 proximate the hosel 109, a toe 122 distal from the hosel 109, a front 124, and a back or rear 126. The shape and design of the head 102 may be partially dictated by the intended use of the device 100. The heel portion 120 is attached to and/or extends from the hosel 109 (e.g., as a unitary or integral one piece construction, as separate connected elements, etc.). In the embodiment shown in FIGS. 2-4, the face 112 and the hosel 109 are formed as a single, integral piece, such as by casting, forging, etc. to form a face member 140 as described below. In another embodiment, the face 112 and the hosel 109 may be formed of two or more separate pieces that are connected together by an integral joining technique or another joining technique. It is understood that in each embodiment described herein, the face 112 and hosel 109 may be integrally formed as a single piece, or formed of separate pieces. In other applications, such as for a different type of golf club, the head may be designed to have different dimensions and configurations.

The face 112 is located at the front 124 of the head 102, and has an outer surface 110, as well as an inner surface 111 located opposite the outer surface 110. The face 112 is defined by a plurality of peripheral edges, including a top edge 113, a bottom edge 115, a heel edge 117, and a toe edge 119. The face 112 also has a plurality of face grooves 121 on the ball striking surface 110. For reference purposes, the portion of the face 112 nearest the top face edge 113 and the heel 120 of the head 102 is referred to as the "high-heel area"; the portion of the face 112 nearest the top face edge 113 and toe 122 of the head 102 is referred to as the "high-toe area"; the portion of the face 112 nearest the bottom face edge 115 and heel 120 of the head 102 is referred to as the "low-heel area"; and the portion of the face 112 nearest the bottom face edge 115 and toe 122 of the head 102 is referred to as the "low-toe area". Conceptually, these areas may be recognized and referred to as quadrants of substantially equal size (and/or quadrants extending from a geometric center of the face 112), though not necessarily with symmetrical dimensions. For at least some types of club heads, the face 112 may include some curvature in the top to bottom and/or heel to toe directions (e.g., bulge and roll characteristics), as is known and is conventional in the art for such clubs. As seen in the illustrative embodiments in FIGS. 2-5, the ball striking surface 110 is inclined (i.e., at a loft angle), to give the ball an appreciable degree of lift and spin when struck. In other illustrative embodiments, the ball striking surface 110 may have a different incline or loft angle, to affect the trajectory of the ball.

The body 108 and the face 112 of the golf club head 102 may be constructed from a wide variety of different materials, including materials conventionally known and used in the art, such as steel, titanium, aluminum, tungsten, graphite, polymers, or composites, or combinations thereof. Also, if desired, the club head 102 may be made from any number of pieces (e.g., having a separate face mask, etc.) and/or by any construction technique, including, for example, casting, forging, welding, and/or other methods known and used in the art.

The ball striking device 100 may include a shaft 104 connected to or otherwise engaged with the ball striking head 102, as shown in FIG. 1. The shaft 104 is adapted to be gripped by a user to swing the ball striking device 100 to strike the ball. The shaft 104 can be formed as a separate piece connected to the head 102, such as by connecting to the hosel 109, as shown in FIG. 1. In other illustrative embodiments, at least a portion of the shaft 104 may be an integral piece with the head 102, and/or the head 102 need not contain a hosel 109 or may contain an internal hosel structure. Still further embodiments are contemplated without departing from the scope of the invention. The shaft 104 may be constructed from one or more of a variety of materials, including metals, ceramics, polymers, composites, or wood. In some illustrative embodiments, the shaft 104, or at least portions thereof, may be constructed of a metal, such as stainless steel or titanium, or a composite, such as a carbon/graphite fiber-polymer composite. However, it is contemplated that the shaft 104 may be constructed of different materials without departing from the scope of the invention, including conventional materials that are known and used in the art. A grip element 105 may be positioned on the shaft 104 to provide a golfer with a slip resistant surface with which to grasp golf club shaft 104, as shown in FIG. 1. The grip element 105 may be attached to the shaft 104 in any desired manner, including in conventional manners known and used in the art (e.g., via adhesives or cements, threads or other mechanical connectors, swedging/swaging, etc.).

In one exemplary embodiment, shown in FIGS. 3-4, the head 102 includes a rear cavity 130 located behind the face 112, which is defined at least partially by the inner surface 111 of the face 112. As shown in FIGS. 2-4, the body 108 further includes a sole body member 131 extending rearward from the bottom edge 115 of the face 112 and defining a portion of the rear cavity 130. The rear cavity 130 may also be partially defined by peripheral or perimeter walls 133 extending rearward from the peripheral edges of the face 112, including from the top edge 113, the heel edge 117, and the toe edge 119 of the face 112. It is understood that the sole member 131, or a portion thereof, may be considered to be a peripheral wall 133 as that term is used herein. The peripheral walls 133 follow the curvilinear contour of the body 108, and portions of the rear cavity 130 are defined by the peripheral walls 133, including the sole member 131. Further, the head 102 of FIGS. 2-4 includes a rear wall 132 extending upward from the rear of the sole member 131, and partially defining the rear cavity 130. In the embodiment shown, the rear wall 132 extends the entire width of the rear cavity 130, and is connected to the rear of the sole member 131 and the peripheral walls 133 on the heel side 120, the toe side 122, and the top side 116 of the head 102. The rear wall 132 may have a different thickness than other portions of the body member 142, and in an alternate embodiment, may comprise a thin polymer sheet that may be transparent and may influence impact attenuation and/or acoustic characteristics. In additional embodiments, the head 102 may have a differently configured sole member, cavity, or rear wall, or may not contain some of these components. For example, the features described herein can be used in connection with the embodiments illustrated in FIGS. 8-15 and other known configurations for club heads, including other iron-type club head configurations, as well as hybrid club heads and wood-type club heads. As described below, the head 402 of FIGS. 10-11 includes a rear wall 432 that extends completely across the rear cavity 430 of the head 402, from the peripheral wall 433 on the heel side 420 to the peripheral wall 433 on the toe side 422, but only extends a portion of the distance from the sole member 431 to the peripheral wall 433 on the top side 416. Additionally, the head 502 of FIGS. 12-13 has a rear cavity 532 with no rear wall extending upward from the sole member 531, and the head 602 of FIG. 14 has a blade-type configuration with a solid body 608 and no rear cavity.

In general, the head 102 is formed of at least two separate pieces, including a face member 140 and a body member 142 connected to the face member 140. The face member 140 and the body member 142 combine to define the head 102 and features thereof, including the face 112 and the body 108 of the head 102, as described below. It is understood that each of the face member 140 and/or the body member 142 individually may be formed of multiple pieces, and thus, the head 102 may be formed of two or more pieces connected together.

The face member 140 generally includes and defines at least the face 112 of the head 102, including the ball striking surface 110 and the inner surface 111. The face member 140 is also understood to have a rear surface 141, which may include the inner surface 111 of the face 112. In the embodiment shown in FIG. 4, the face member 140 includes the face 112, as well as wall portions 127 that extend rearwardly on the edges 113, 115, 117, 119 of the face 112 and form at least a part of the peripheral walls 133 (including the sole member 131). In other embodiments, such as the embodiments shown in FIGS. 13-14 and described in greater detail below, the face member 140 does not include the rearwardly-extending wall portions 127. The face member 140 may be made at least partially of a metallic material, and in one embodiment, at least primarily of a metallic material, including the metallic materials described above. For example, the face member 140 may be formed primarily, or at least partially, of a titanium alloy, a stainless steel alloy, or another material commonly used in forming iron-type club heads, or combinations of such materials. In another embodiment, the face member 140 may be formed primarily, or at least partially, of a polymer material that may include a reinforcing material and/or a doping material, such as the materials described below with respect to the body member 142. Additionally, in one embodiment, the face member 140 is formed entirely of a single material, and may also be formed as a single piece. Further, the hosel 109 may also be formed of the same material(s), and may be part of an integral single-piece face member 140. For example, in the embodiment shown in FIGS. 2-4, the hosel 109 and the face member 140 are integrally formed as a single piece. In another embodiment, the hosel 109 may be joined to the face member 140 and/or the body member 142, such as by using an integral joining technique, to form a single, integral piece.

The body member 142 is connected to face member 140 and extends rearwardly from the face member 140 to form at least a portion of the body 108 of the club head 102. In the embodiment shown in FIGS. 2-4, the body member 142 is connected to the perimeter portions of the rear surface 141 of the face member 140. In another embodiment, the body member 142 (or a portion thereof) and the face member 140 (or a portion thereof) may be formed of the same material, and may be formed of a single, integral piece, such as shown in FIG. 7C. Additionally, as described above, at least some portions of the body member 142 may be spaced from at least some portions of the rear surface 141 of the face member 140 to create a rear cavity 130 behind the face 112 and within the head 102. In the embodiment of FIGS. 2-4, the face member 140 and body member 142 define an enclosed rear cavity 130 that extends from the top 116 to the sole 118 and from the heel 120 to the toe 122 of the head 102. Further, in this embodiment, the peripheral walls 133, including the sole member 131, are formed partially by the rearwardly-extending wall portions 127 of the face member 140 and partially by the body member 142. In other embodiments, the rear cavity 130 may be at least partially open, such as the rear cavities 430, 530 of the heads 402, 502 in FIGS. 10-13, or may have a different configuration, or the head 102 may have no rear cavity 130 at all, such as the head 602 in FIG. 14.

The body member 142 may be made from one or more of a variety of materials, and the body member 142 may be made from a different material than the face member 140. As described above, in some embodiments, the body member 142 and the face member 140 may be completely or partially made from the same material. In one embodiment, the body member 142 and/or the face member 140 is made entirely, primarily, or at least partially from a polymer material. It is understood that a "polymer material" may include blends of different polymers, copolymers, etc. In one embodiment, the body member 142 may also contain non-polymer materials along with the polymer material, such as a reinforced polymer composite material that includes a polymer material and a reinforcing material such as a fiber engaged with the polymer material. Examples of polymer materials that can be used include acrylonitrile butadiene styrene (ABS), polyamide alloys (e.g., polyamide 6, polyamide 6/10, polyamide 6/6), high density polyethylene (HDPE), styrene ethylene butylene styrene block copolymer (SEBS), thermoplastic polyurethane (TPU) or other polyurethane, rubber materials, silicones, and other polymers and copolymers. Examples of reinforcing materials that can be used include carbon/graphite fibers, glass fibers, basalt fibers, boron fibers, liquid crystal polymer fibers (e.g., Vectran) or other polymer-based fibers (e.g. UHMWPE, Kevlar, etc.). The polymer material can be formed using a variety of techniques, such as injection molding or other molding techniques, prepreg processing or other composite processing techniques, or other polymer processing techniques available to those skilled in the art. In one embodiment, the polymer material may be lightweight, and the polymer material may be selected for other properties as well. For example, polymer materials with lower flexibility may be selected for enhanced strength and/or rigidity, or polymer materials with higher flexibility may be selected for sound and/or vibration dampening properties. As another example, polymer materials may be selected for their thermal properties or ease of processing. In another embodiment, the body member 142 may be formed of another material that does not contain any polymer material. Further, like the face member 140, the body member 142 may be formed of several pieces or a single, integral piece, and may be formed from multiple pieces joined together by an integral joining technique.

Figure 4A:
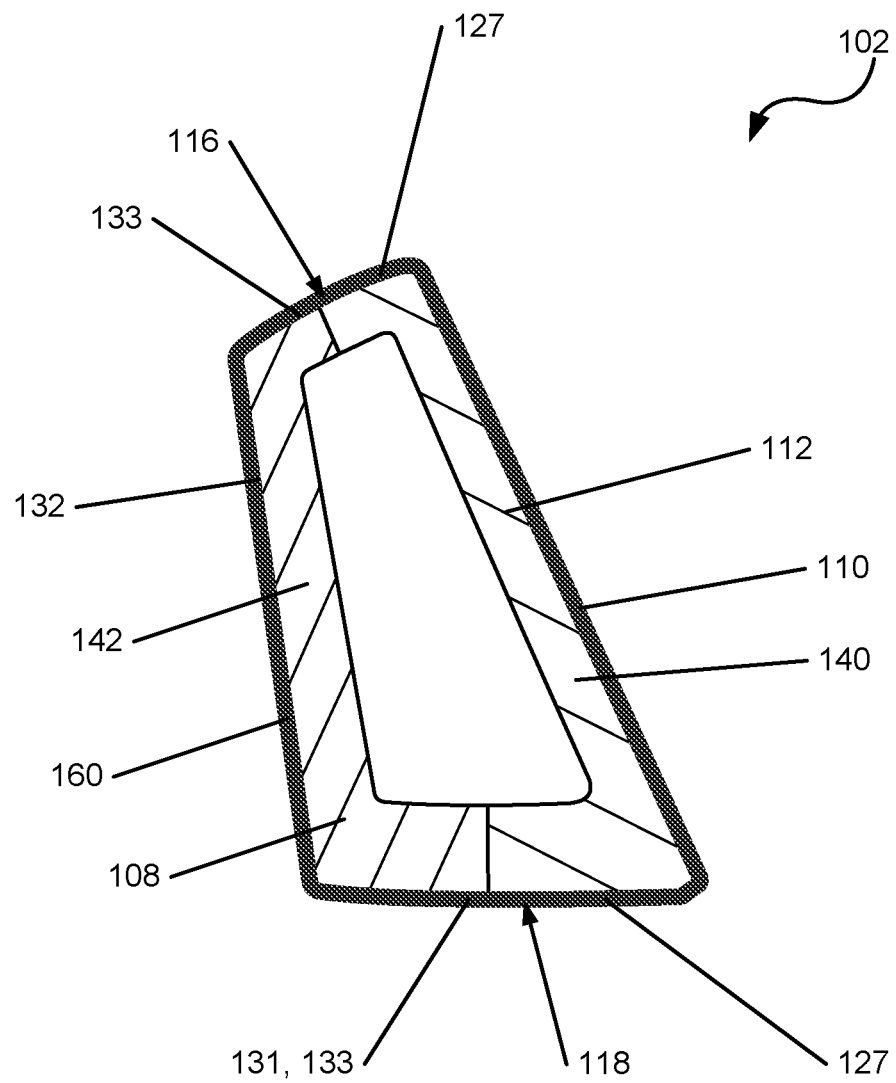
FIG. 4A is a cross-section view of the head as shown in FIG. 4, having a coating material disposed on an outer surface thereof.

As illustrated in FIG. 4A, the head 102 may also include a coating material 160 disposed on at least a portion of the outer surface of the head 102. The coating material 160 may impart one or more desirable properties to the coated portions of the head 102, including strength, hardness, visual appearance or other optical properties, frictional properties, wear resistance, corrosion resistance, or other properties. In one embodiment, the coating material 160 is a nano-coating material, such as a fine coating of metallic particles (e.g. nickel, iron, and/or zinc), which may be applied by spraying. This coating material 160 can add structural strength and hardness, particularly to polymer-based components of the head 102, as well as creating a metallic appearance. The coating material 160 may also help bind different components of the head 102 together, such as the face member 140 and the body member 142. As shown in FIG. 4A, the entire outer surface of the head 102 may be coated to create a uniform visual impression. In another embodiment, at least the outer surface of the portion(s) of the head 102 that are formed of the polymer material are coated with the coating material 160.

In the embodiment shown in FIGS. 2-4, the body member 142 also contains a doping material that is dispersed throughout a portion of the material of the body member 142, such as a powder or other particulate material. In general, the doping material has at least one different property from the material of the body member 142 and thereby changes the properties of the body member 142. In one embodiment, the doping material has a greater density than the material of the body member 142, so that the area or areas where the doping material is located have a higher density or weight than the other portions of the body member 142. This allows the weighting and the weight distribution of the body member 142 to be controlled, adjusted, and/or customized. One example of a dense doping material that can be used is tungsten powder, although other dense metals or other materials may be used, including stainless steel, brass, copper, lead, etc., as well as non-metals such as various oxides, sulfates, etc. In one embodiment, at least a portion of the body member 142 is formed of rubber doped with tungsten powder.

It is understood that the doping material may include more than one different material substance, and that multiple doped portions may be provided throughout the body member 142, and, if desired, these multiple doped portions may contain different doping materials. Additionally, in one embodiment, doped or weighted portions having substantially identical sizes, but with densities that vary ten-fold, such as from 1.2-12.0 g/cc, can be created by using different doping materials and/or different volume fractions of doping materials in the doped portions. In other embodiments, further weights and densities can be achieved. In one embodiment, one or more of the doped portions containing the doping material may have a density of 9.0-10.0 g/cc.

Figure 5G:
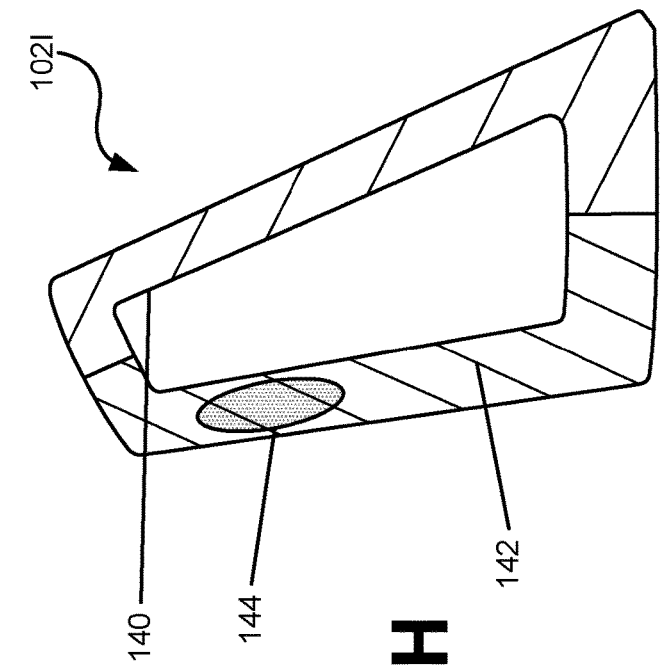
Figure 5H:
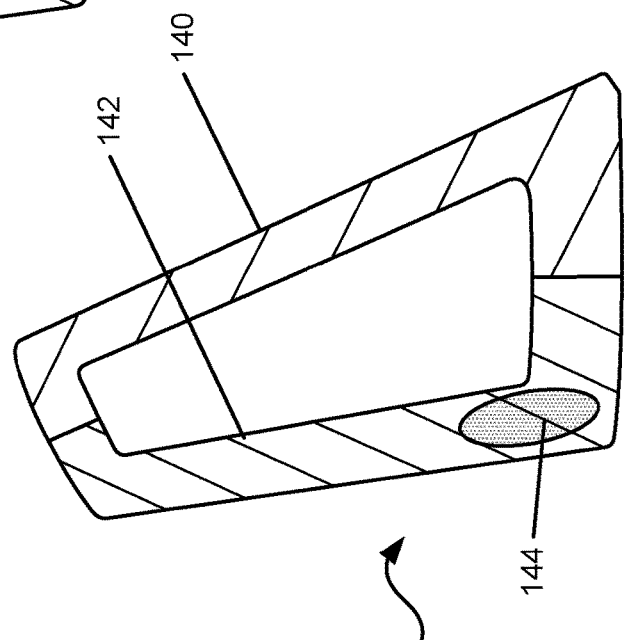
Figure 5I:
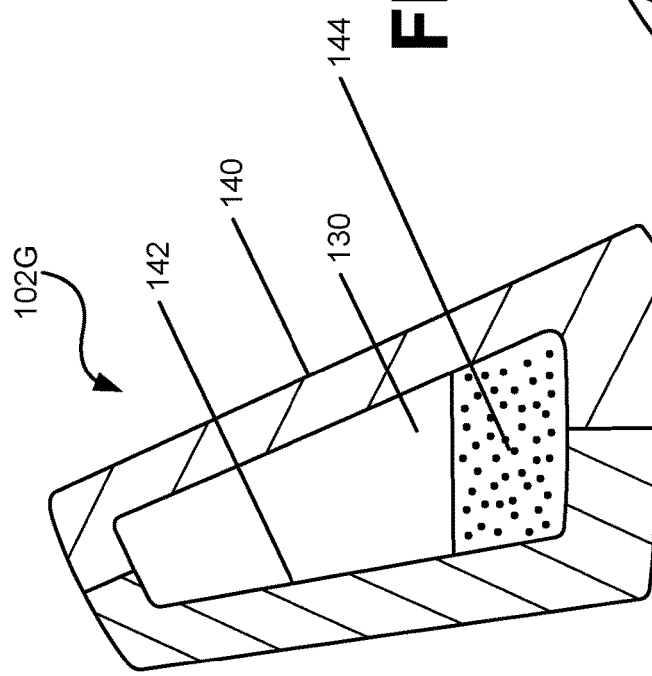
Figure 6:
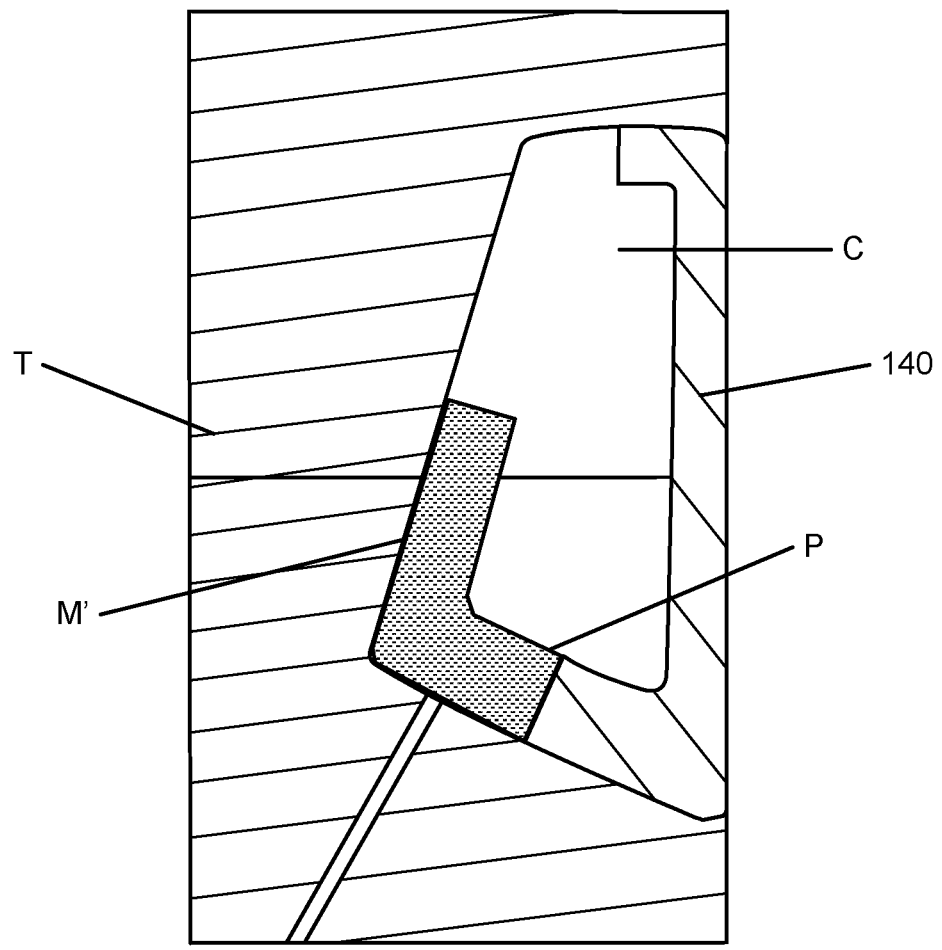
FIG. 6 is a cross-sectional view of one illustrative embodiment of a mold and process capable of forming a head of a ball striking device as shown in FIG. 2.
Figure 7:
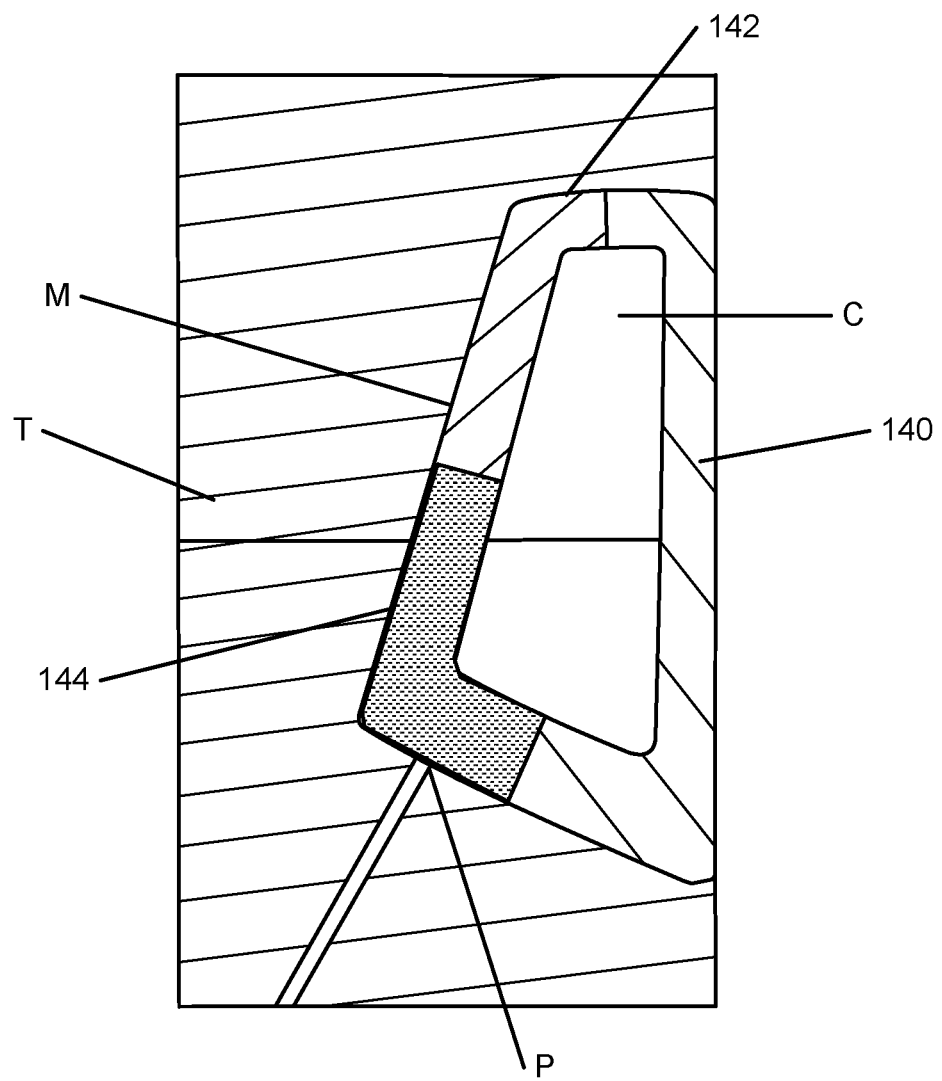
FIG. 7 is a cross-sectional view of the mold and process of FIG. 6, shown after a polymer material is introduced into a cavity of the mold.

FIGS. 5A-5I illustrate different embodiments of club heads 102A-I that have similar structure to the head 102 of FIGS. 2-4, each having a doped portion 144 positioned in different locations. FIG. 5A illustrates a head 102A where the doped portion 144 comprises the entire body member 142. FIG. 5B illustrates a head 102B where the doped portion 144 comprises the entire face member 140. FIG. 5C illustrates a head 102C where the doped portion 144 comprises an upper portion of the body member 142. FIG. 5D illustrates a head 102D where the doped portion 144 comprises a lower portion of the body member 142. FIG. 5E illustrates a head 102E where the face member 140 comprises a first doped portion 144A and the body member 142 comprises a second doped portion 144B, with the first and second doped portions 144A,B having different doping configurations. For example, the first and second doped portions 144A,B may have different doping materials, doping materials having different properties, etc. FIG. 5F illustrates a head 102F where the upper portion of the body member 142 comprises a first doped portion 144A and a lower portion of the body member 142 comprises a second doped portion 144B, with the first and second doped portions 144A,B having different doping configurations. FIG. 5G illustrates a head 102G where the doped portion 144 is located within an internal cavity 130 of the head 102G. The doped portion 144 could be formed along with the head 102G, such as shown in FIGS. 6-7 below, or may be an insert that is subsequently placed in the cavity 130. In the embodiment illustrated in FIG. 5G, the doped portion 144 is positioned in a lower portion of the internal cavity. FIGS. 5H and 5I illustrate heads 102H and 102I where the doped portion 144 is a more discrete area of the head 102H, 102I and is completely embedded within the body member 142.

In the heads 102C and 102I of FIGS. 5C and 5I, the dense doping material would result in a higher center of gravity relative to the other embodiments and relative to a non-doped head. In the heads 102D, 102F, 102G, and 102H of FIGS. 5D, 5F, 5G, and 5H, the dense doped portion 144 would result in a lower center of gravity relative to the other embodiments and relative to a non-doped head. In the heads 102A and 102C-I of FIGS. 5A, and 5C-5I, the dense doped portion 144 would result in a center of gravity that is more rearward relative to the other embodiments and relative to a non-doped head. In the head 102B of FIG. 5B, the dense doped portion 144 would result in a center of gravity that is more frontward relative to the other embodiments and relative to a non-doped head. It is understood that the embodiments of FIGS. 5A-5I illustrate higher and lower portions of the head 102 being formed with doping material, however in other embodiments, lateral portions of the head may be formed with different weighting through the use of doping material, such as in FIGS. 17-19. Thus, a nearly infinite number of weighting configurations are possible by positioning the doped portion 144 in different locations in the body member 142, including changing the weighting in the heel-to-toe direction as well. In other embodiments, the head 102 may include multiple doped portions 144 that have dispersed doping material.

The face and body members 140, 142 may be formed and connected in a variety of manners. For example, the face and body members 140, 142 may be formed as separate pieces and connected together. In one illustrative embodiment, the face and body members 140, 142 can be formed together in a co-molding process, as shown in FIGS. 6-7. In the embodiment shown in FIGS. 6-7, the face member 140 may be formed using any techniques described herein, prior to the commencement of the co-molding process. In one embodiment, the face member 140 may be formed wholly or primarily of a metallic material. The face member 140 may then be brought into communication with a tool T that is used for forming the body member 142. In this embodiment, the tool T is a mold having a cavity C that can be used for forming the body member 142, and the face member 140 is placed into communication with the mold cavity C. At least a portion of the rear surface 141 of the face member 140 may be in communication with (e.g., exposed to the interior of) the cavity C, and in the embodiment shown in FIG. 6, the entire rear surface 141 of the face member 140 is positioned within the mold cavity C. Once the face member 140 and the tool T are in position, the body member 142 can be formed using the tool T, such as by introducing a material M into contact with the tool T and the face member 140 to form the body member 142 in connection with the face member 140. In the embodiment illustrated in FIG. 7, the material M is a flowable polymer material that is injected into the mold cavity C through injection port P and fills at least a portion of the cavity C, forming around the cavity C and in contact with the rear surface 141 of the face member 140. It is understood that the tool T may contain additional structures for forming the flowable material M into the shape of the body member 142, such as an inflatable bladder, a mold core, etc., or that gravity, fluid pressure, etc. could also be used to shape the flowable material M. The material M can then harden and/or solidify to form the body member 142. As shown in FIG. 7, in this embodiment, the polymer material M forms around the interior surface of the mold cavity C and is spaced from at least a portion of the rear surface 141 of the face member 140, such that the face member 140 and the body member 142 combine to define the interior cavity 130.

In other embodiments, the material M may be introduced into contact with the tool T in a different manner. For example, the material M may be poured into the mold cavity C, or may be brought into contact with the tool T in a non-flowable form, such as a blank preform, a prepreg, etc. It is understood that as described above, the tool T may contain additional structures for forming the inside of the body member 142, such as an inflatable bladder, a mold core, etc. A different type of tool T may be used in other embodiments. Further, the tool T is illustrated as a two-piece mold that can be separated or opened in order to bring the face member 140 into communication with the cavity C, although in other embodiments, the tool T may have a single-piece configuration or another multi-piece configuration.

The doping material may also be utilized in the process as illustrated in FIGS. 6-7. In one embodiment, a doped portion 144 is introduced into the tool T before or after introducing the polymer material M into contact with the tool T, as illustrated schematically in FIGS. 6-7. For example, the doped portion 144 may be positioned in contact with the tool T using a two-shot or multi-shot molding technique. In such a technique, a loaded polymer material M' is first shot into the tool T, or otherwise brought into contact with or placed in the tool T in the appropriate locations, as shown in FIG. 6, to form the doped portion 144. The tool T may have suitable injection control mechanisms and features, as known in the art. Thereafter, a non-doped polymer material M is brought into contact with the tool T to create the rest of the part such as by injection, as shown in FIG. 7. The doped material M' becomes at least partially connected to the polymer material M when the polymer material M is introduced into contact with the tool T, and is thereby at least partially contained or dispersed within a portion of the body member 142 after the body member 142 hardens or solidifies. As shown in this embodiment, the doped material M' may also be in contact with the face member 140. The base polymer of the loaded polymer material M' may be the same or a similar material as the polymer material M, or it may be a different material.

Figure 7A:
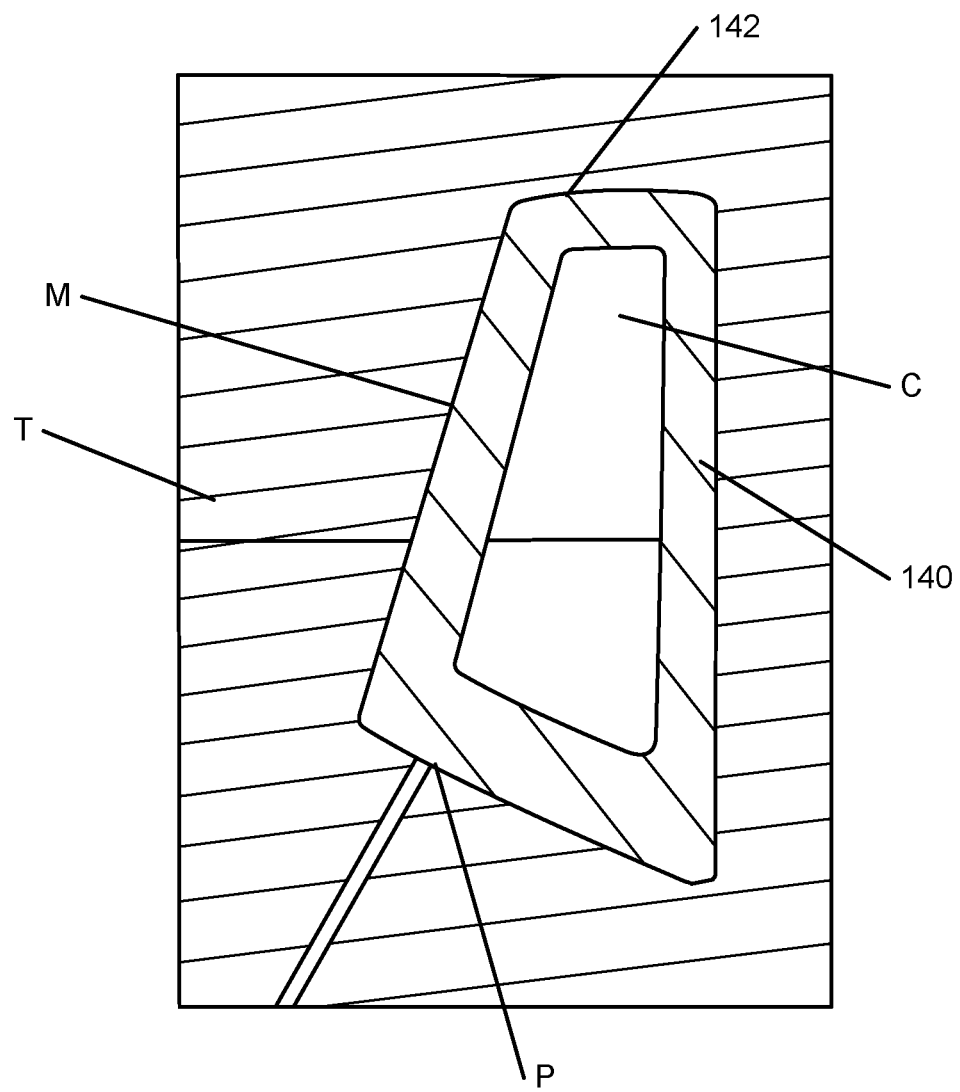
FIG. 7A is a cross-sectional view of another illustrative embodiment of a mold and process capable of forming a head of a ball striking device.

In another embodiment, as illustrated in FIG. 7A, both the face member 140 and the body member 142 (or portions thereof) may be formed by a tool T. For example, as described above, both the face member 140 and the body member 142 may be formed of the same material and may be formed together by injecting the polymer material M into the tool T. FIG. 7A illustrates this configuration, and it is understood that at least a portion of the face member 140 and/or the body member 142 may be formed of a doped material M' as described above. As another example, the face member 140 and the body member 142 may be formed of different polymer materials that are both formed by using the tool T. Either or both of the face member 140 and the body member 142 may include a doped material M' as described above.

In a further embodiment, at least a portion of the face member 140 and/or the body member 142 may be formed of a polymer material M, as shown in FIGS. 6-7A, and a doping material 144 may subsequently be embedded within the polymer material M. This can be done, for example, by using a pressurization technique.

As mentioned above, the co-molding process may also utilize a reinforcing material to reinforce the polymer material M. In one embodiment, a reinforcing material, such as a fiber, may be positioned in contact with or proximate the tool T prior to introducing the polymer material M into contact with the tool T. When the polymer material M is introduced into contact with the tool T, the reinforcing material becomes embedded within the polymer material. In another embodiment, the polymer material M may contain a reinforcing material that is introduced into contact with the tool T along with the polymer material M, such that the fiber reinforcing material is embedded within the polymer material M after the polymer material M forms the body member. For example, the polymer material M and the reinforcing material may be formed together as a prepreg, and the polymer material and the fiber reinforcing material can be introduced into contact with the tool by placing the prepreg into contact with the tool. As another example, the polymer material M may be in flowable form and may have a particulate reinforcing material dispersed throughout the flowable material M. The polymer material and the fiber reinforcing material are introduced into contact with the tool T by injecting the polymer material M into contact with the tool T along with the dispersed fiber reinforcing material.

The face member 140 may be connected to the body member 142 through one or more of many different connection configurations. The embodiment shown in FIGS. 2-4 does not illustrate any specific connecting structure, and the face and body members 140, 142 may be connected as depicted in FIGS. 2-4, such as by use of a bonding material, as described below. In one embodiment, the face member 140 and the body member 142 of FIGS. 2-4 have complementary mating structures for connection together. For example, one of the face and body members 140, 142 may have a projection and the other may have a complementary recess, cavity, notch, etc., to receive the projection to connect the face and body members 140, 142 together. Examples of such structures are described in more detail below in conjunction with FIGS. 8-9. As described above, the face member 140 and the body member 142 (or portions thereof) may be formed of a single piece and/or a single material in another embodiment.

Figure 8:
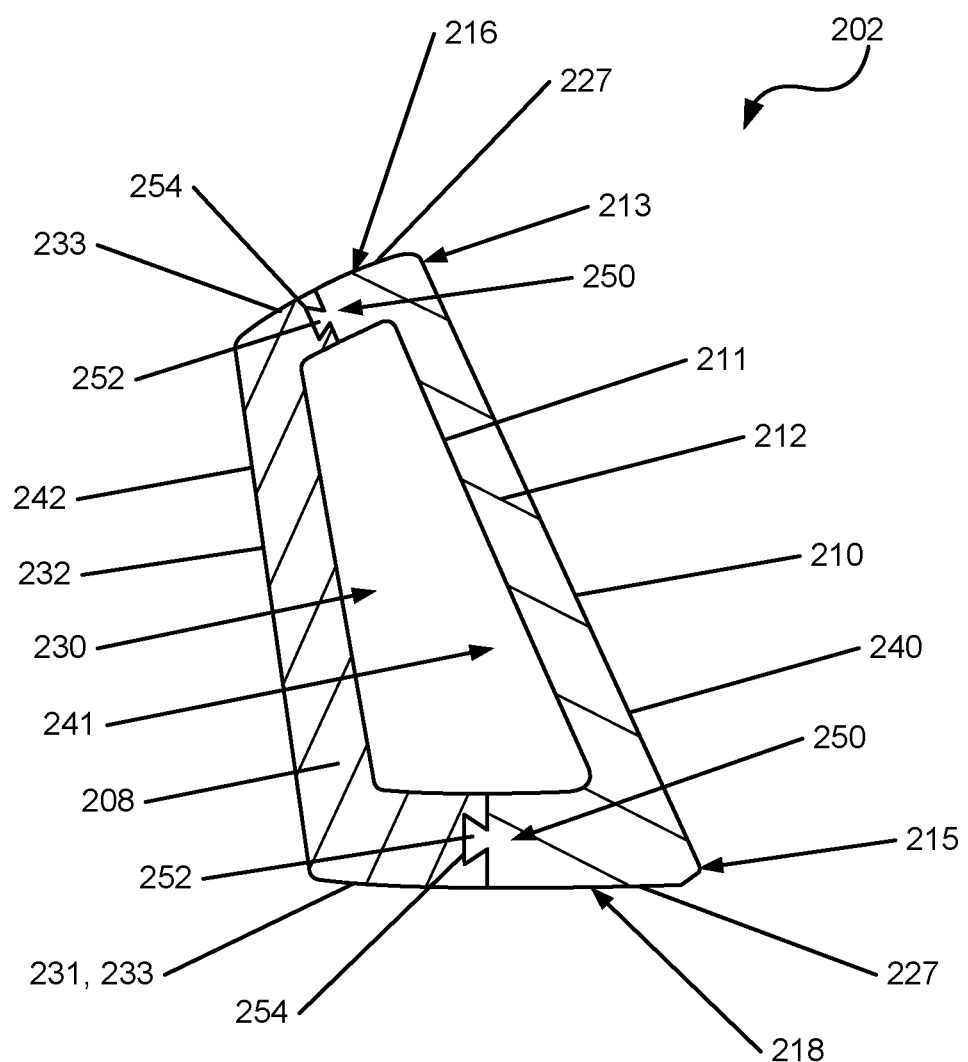
FIG. 8 is a cross-section view of a second illustrative embodiment of an iron-type ball striking head suitable for use with the ball striking device of FIG. 1, having a dovetail-type mating connecting structure.
Figure 8A:
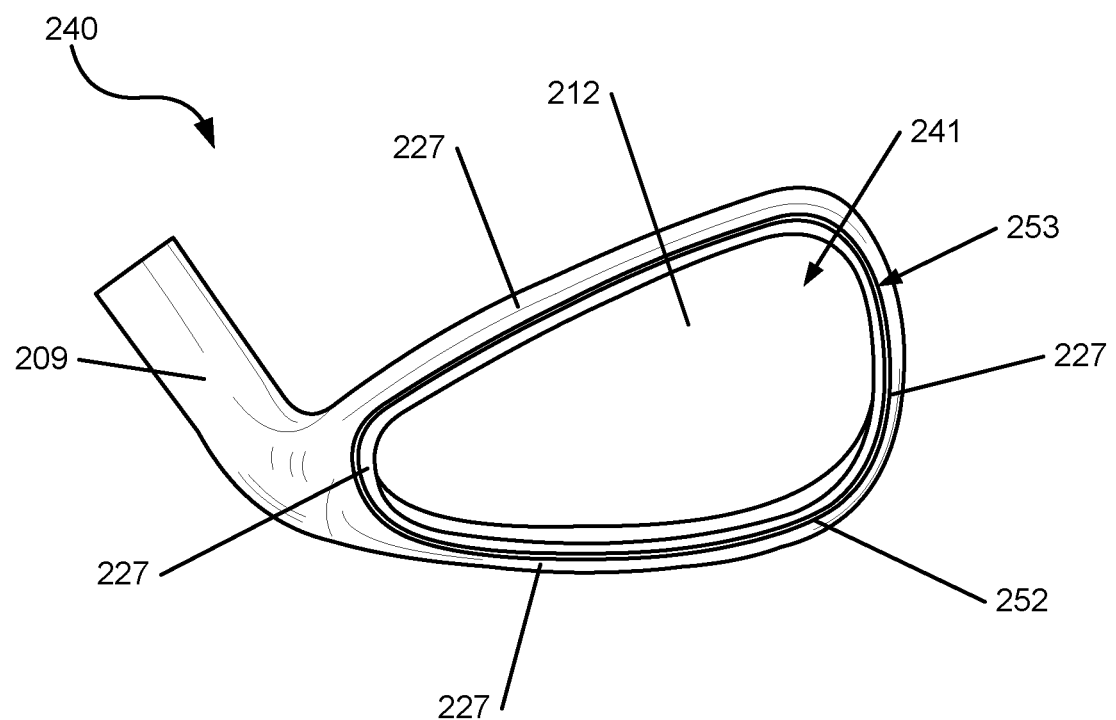
FIG. 8A is a rear view of a face member of the head of FIG. 8.
Figure 9:
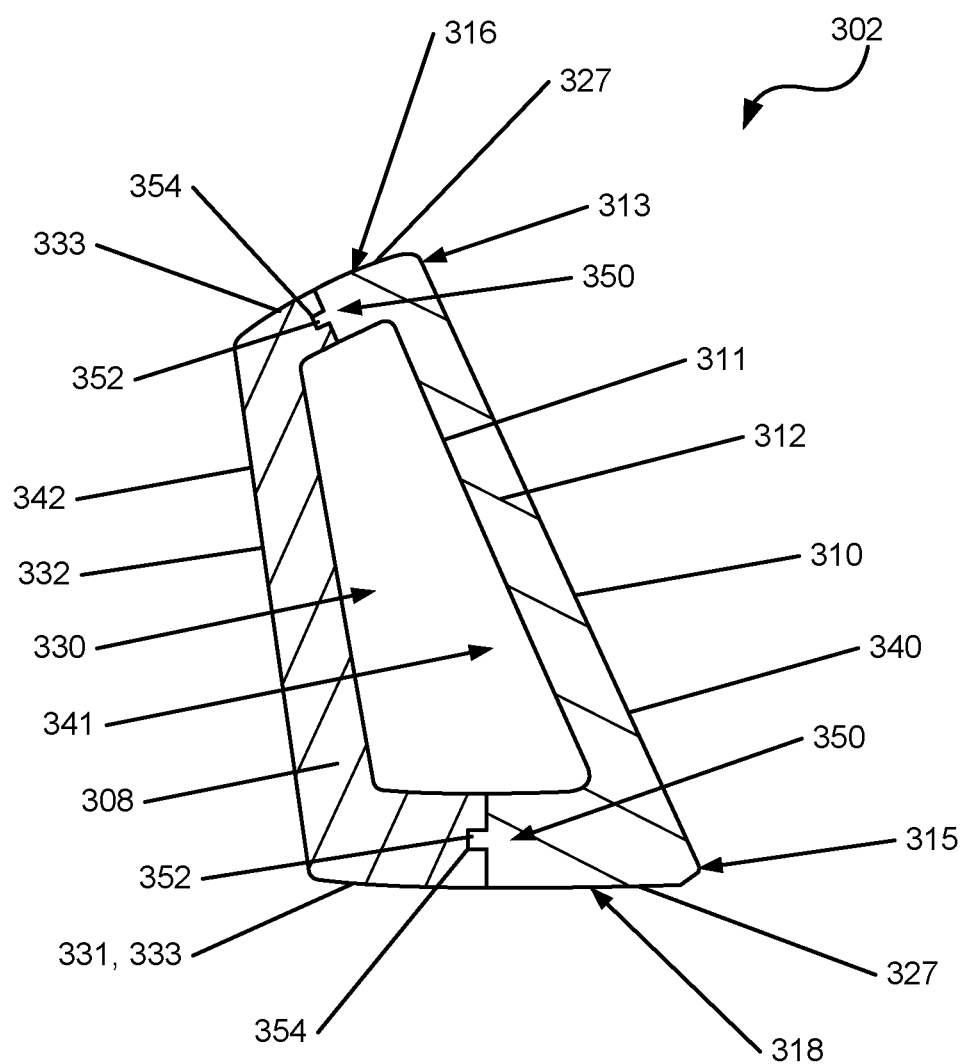
FIG. 9 is a cross-section view of a third illustrative embodiment of an iron-type ball striking head suitable for use with the ball striking device of FIG. 1, having a mating connecting structure.

FIGS. 8-9 illustrate two other embodiments of an iron-type head 202, 302. Many features of the heads 202, 302 of FIGS. 8-9 are similar to the features of the head 102 shown in FIGS. 2-4, and such similar features are identified by similar reference numerals in FIGS. 8-9 using the "2xx" and "3xx" series of reference numerals, respectively. Accordingly, certain features of the heads 202, 302 of FIGS. 8-9 that are already described above may described below using less detail, or may not be described at all. In the embodiment of FIGS. 8 and 8A, the face and body members 240, 242 are connected by a dovetail mating structure 250. The mating structure 250 includes at least one dovetail projection 252 on the face member 240 that is received in at least one dovetail recess 254 on the body member 242. The dovetail projections 252 illustrated in FIGS. 8 and 8A are located at the ends of the wall portions 227 that extend rearwardly from the face 212. In this embodiment, the dovetail projection 252 is in the form of a ridge 253 that extends around the periphery of the rear surface 241 of the face member 240, as illustrated in FIG. 8A. Likewise, the recess 254 is in the form of a channel that extends around the periphery of the front of the body member 242. It is understood that the face and body members 240, 242 may be connected by the material M of the body member 242 forming around the dovetail projection 252. That the face and/or body member 240, 242 may additionally or alternately contain structure to aid in snapping the components together and/or separating the components.

In the embodiment of FIG. 9, the face and body members 340, 342 are connected by a friction-fit or interference fit mating structure 350. The mating structure 350 includes at least one projection 352 on the face member 340 that is received in at least one complementary-shaped recess 354 on the body member 342. The projection 352 illustrated in FIG. 9 is located at the ends of the wall portions 327 that extend rearwardly from the face 312, similar to the projection 252 in FIGS. 8 and 8A. In this embodiment, the projection 352 is in the form of a ridge 353 that extends around the periphery of the rear surface 341 of the face member 340, similar to the ridge 253 illustrated in FIG. 8A. Likewise, the recess 354 is in the form of a channel that extends around the periphery of the front of the body member 342.

It is understood that the ridge-projections 252, 352 in FIGS. 8-9 are depicted as a single uninterrupted ridge, but could also be in the form of several smaller ridges that may be disrupted or spaced from each other, or more discrete structures that are farther separated from each other, such as a series of post-like ridges. The channel-recesses 254, 354 may be similarly configured. It is understood that the head 202, 302 may include any number of projections 252, 352 and/or recesses 254, 354. In another embodiment, the orientation of the projection(s) and channel(s) may be transposed, so that the body member 242, 342 has a projection or other male-type mating structure and the face member 240, 340 has a recess or other female-type mating structure. Optionally, each part 240, 242, 340, 342 may include a mixture of male and female type mating structures.

In further embodiments, the face member 240, 340 and the body member 242, 342 may have additional types of mating connecting structure or other connecting structures. For example, the face and body members 240, 340, 242, 342 may have other mechanical connecting structures, such as lap joints, fasteners, tabs or snap fitting arrangements, including other complementary mating-type structures, and/or may include the use of a bonding material, such as adhesive, cement, welding, brazing, soldering, etc. It is understood that a combination of mechanical connecting structure and bonding material may be used in some embodiments, and that a bonding material may be used with the embodiments in FIGS. 8-9. Such complementary mating-type structures may include any of various interlocking structures as well.

The complementary mating structures described herein can be utilized in connection with a co-molding method as described above and illustrated in FIGS. 6-7. For example, with reference to the mating structure 250 of the head 202 of FIGS. 8 and 8A, the face member 240 may be inserted into the mold tool T as described above, and the material M of the body member 242 may form around the projection 252. Thus, the recess 254 may be inherently formed in the process of co-molding the body member 242 with the face member 240. Other mating structures, such as the mating structure 350 of FIG. 9, may also be formed in this manner.

Any of the features described above with respect to the embodiments in FIGS. 2-9 may be used in a wide variety of other golf club designs, including other iron-type golf club head designs such as those shown in FIGS. 10-14. For example, the use of doped portions 144, the connection between the face members 140, 240, 340 and body members 142, 242, 342, and/or the use of the co-molding process that are described above and shown in FIGS. 2-9 can be incorporated into other types of golf club heads, including the heads 402, 502, 602 of FIGS. 10-14. The embodiments of heads 402, 502, 602 shown in FIGS. 10-14 are described in greater detail below.

Figure 10:
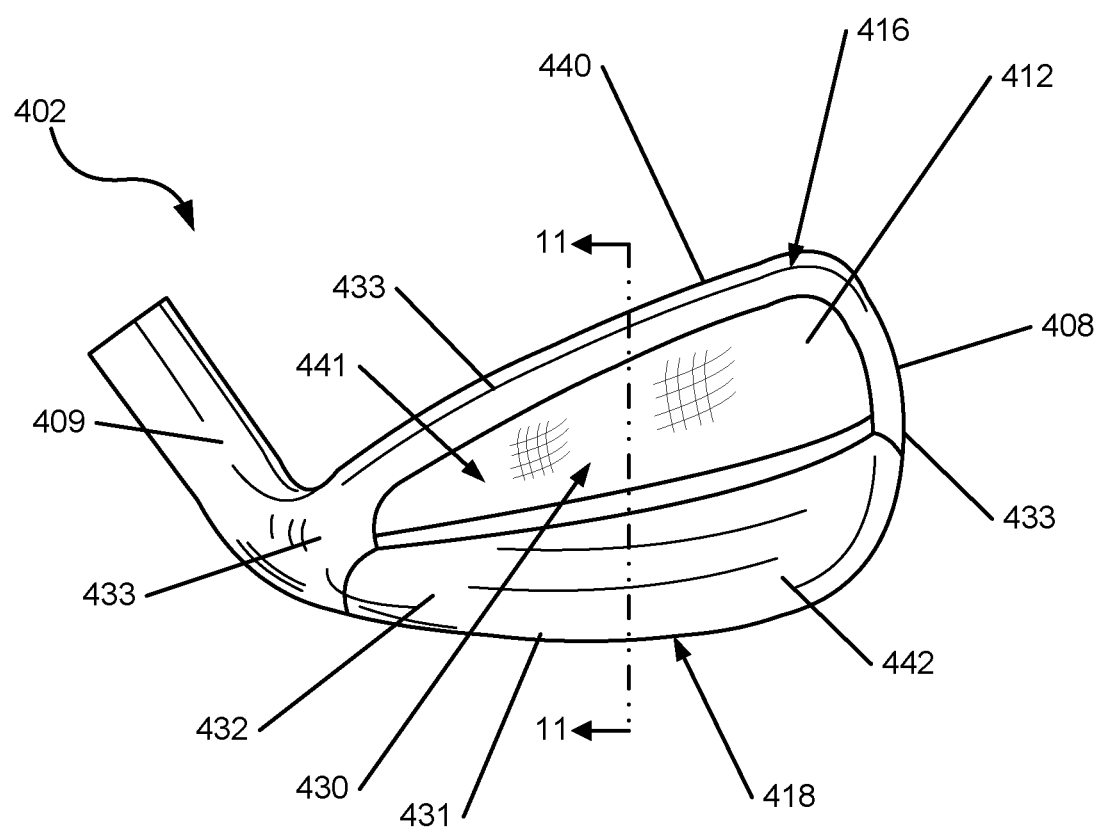
FIG. 10 is a rear view of a fourth illustrative embodiment of an iron-type ball striking head suitable for use with the ball striking device of FIG. 1.
Figure 11:
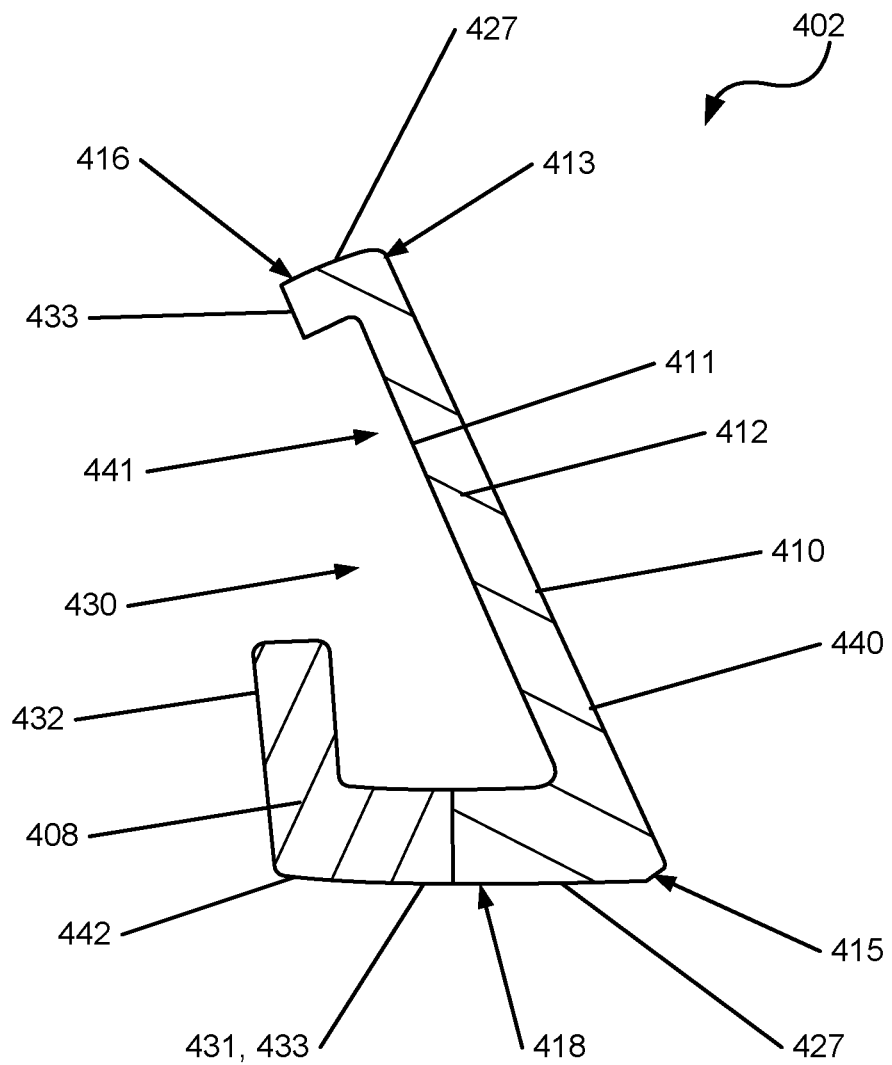
FIG. 11 is a cross-section view of the head of FIG. 10, taken along lines 11-11 of FIG. 10.

FIGS. 10-11 illustrate one embodiment of a golf club head 402 that may utilize one or more of the various features described above. Many features of the head 402 of FIGS. 10-11 are similar to the features of the head 102 shown in FIGS. 2-4, and such similar features are identified by similar reference numerals in FIGS. 10-11 using the "4xx" series of reference numerals. Accordingly, certain features of the head 402 of FIGS. 10-11 that are already described above may described below using less detail, or may not be described at all. In the embodiment shown in FIGS. 10-11, the head 402 has a face member 440 that includes the face 412 and wall portions 427 extending rearwardly from the face 412. The body member 442 is connected to the rear surface 441 of the face member 440, but covers only the lower portions of the rear surface 441 of the face member 440 and does not cover the entire rear surface 441. In other words, the body member 442 is connected to the wall portions 427 of the face member 440 at the sole 418, the heel 420, and the toe 422, but is not connected to the face member 440 around the top 416. Additionally, the head 402 includes a partially-enclosed (or partially-open) rear cavity 430 that is defined by the inner surface 411 of the face 412, the peripheral walls 433, and a rear wall 432 that extends upwardly from the sole member 431. In this embodiment, the rear wall 432 is a part of the body member 442 and extends completely across the rear cavity 430 of the head 402, from the peripheral wall 433 on the heel side 420 to the peripheral wall 433 on the toe side 422, but only extends a portion of the distance from the sole member 431 to the peripheral wall 433 on the top side 416. As with the embodiment shown in FIGS. 2-4, no specific connecting structure is shown in the embodiment of FIGS. 10-11, however any of the connecting structures described herein may be used to connect the face and body members 440, 442 in this embodiment. Likewise, any of the materials and/or forming methods described herein, including the use of doping materials, may be incorporated into this embodiment.

Figure 12:
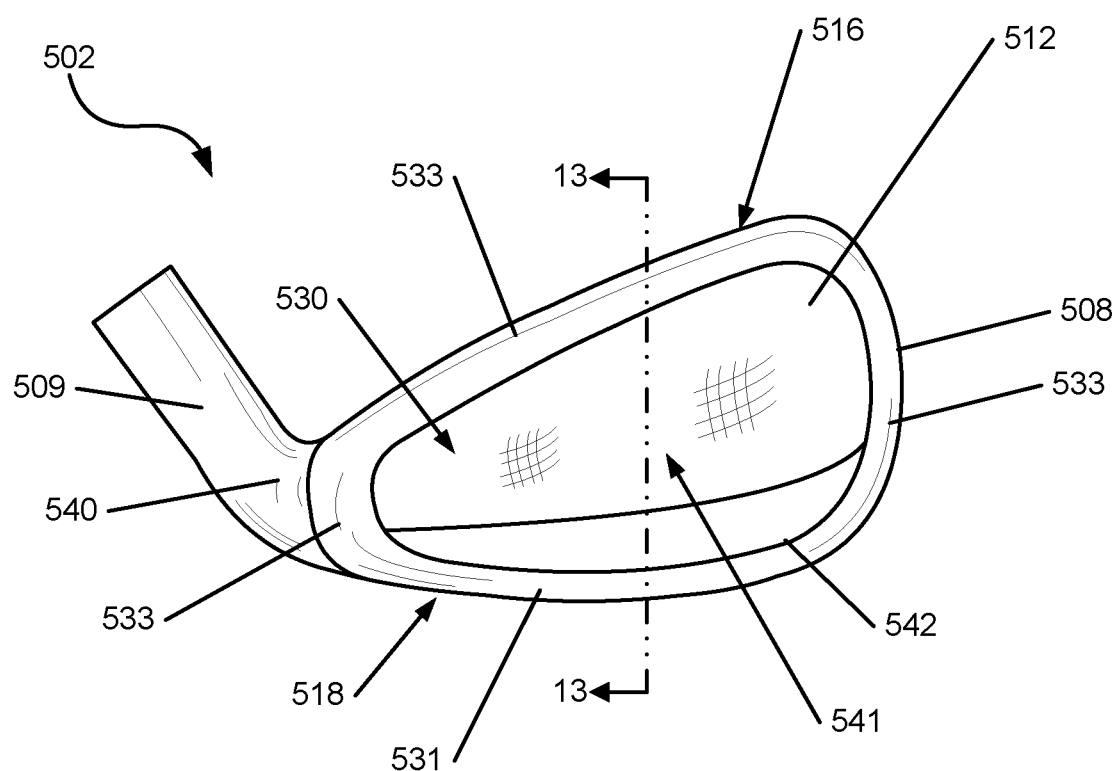
FIG. 12 is a rear view of a fifth illustrative embodiment of an iron-type ball striking head suitable for use with the ball striking device of FIG. 1.
Figure 13:
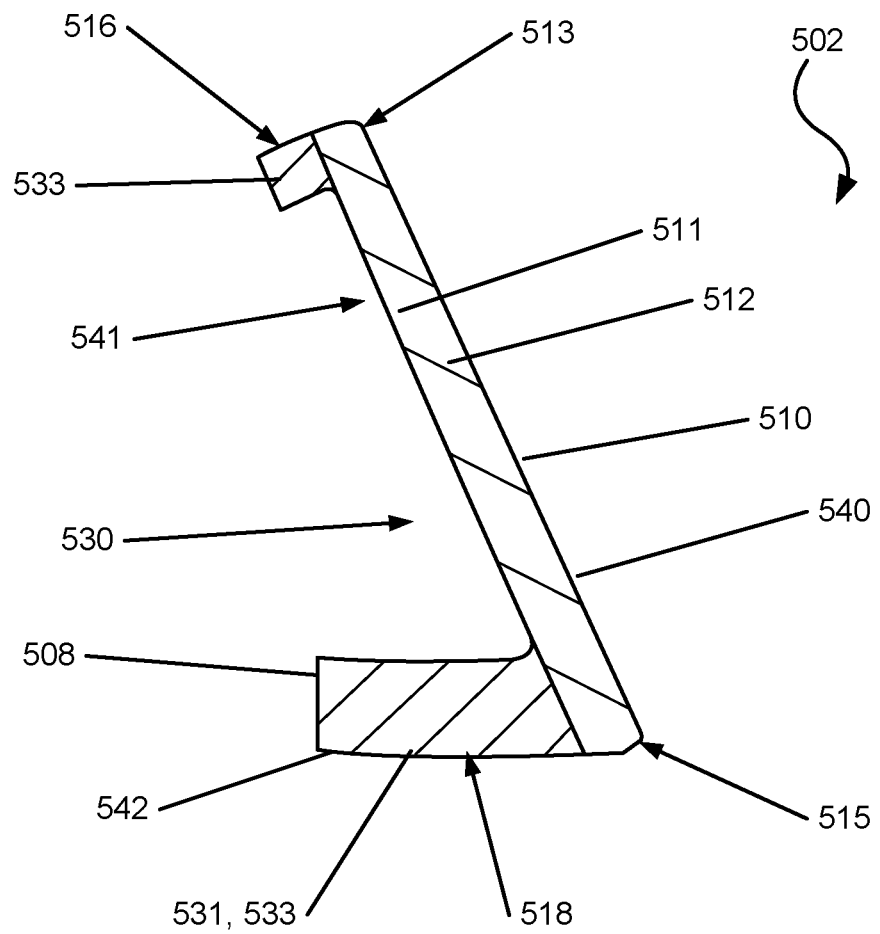
FIG. 13 is a cross-section view of the head of FIG. 12, taken along lines 13-13 of FIG. 12.

FIGS. 12-13 illustrate another embodiment of a golf club head 502 that may utilize one or more of the various features described above. Many features of the head 502 of FIGS. 12-13 are similar to the features of the head 102 shown in FIGS. 2-4, and such similar features are identified by similar reference numerals in FIGS. 12-13 using the "5xx" series of reference numerals. Accordingly, certain features of the head 502 of FIGS. 12-13 that are already described above may described below using less detail, or may not be described at all. In the embodiment shown in FIGS. 12-13, the head 502 has a face member 540 with a plate-like configuration that includes the face 512, with no wall portions (e.g. 127) extending rearwardly from the face 512. In this embodiment, the rear surface 541 of the face member 540 may be embodied entirely by the inner surface 511 of the face 512. The body member 542 is connected to the rear surface 541 of the face member 540, around the peripheral edges 513, 515 of the face 512. Additionally, in this embodiment, the head 502 has an open rear cavity 530 defined by the inner surface 511 of the face 512 and the peripheral walls 533, with no rear wall extending upward from the sole member 531. As with the embodiment shown in FIGS. 2-4, no specific connecting structure is shown in the embodiment of FIGS. 12-13, however any of the connecting structures described herein may be used to connect the face and body members 540, 542 in this embodiment. Likewise, any of the materials and/or forming methods described herein, including the use of doping materials, may be incorporated into this embodiment.

Figure 14:
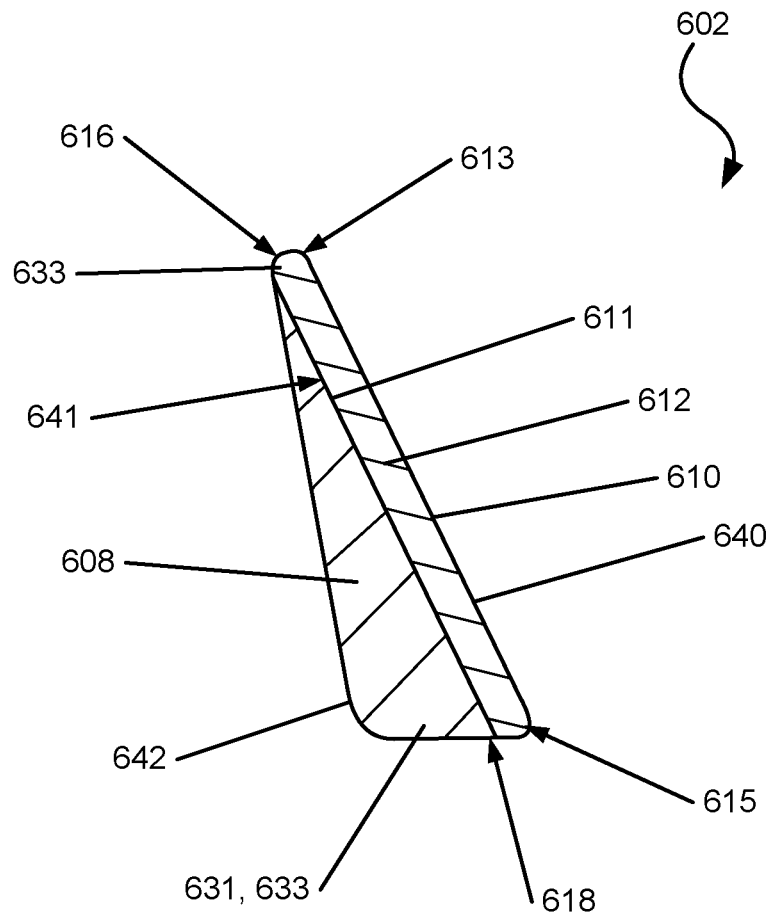
FIG. 14 is a cross-section view of a sixth illustrative embodiment of an iron-type ball striking head suitable for use with the ball striking device of FIG. 1.
Figures 15A, 15B, 15C:
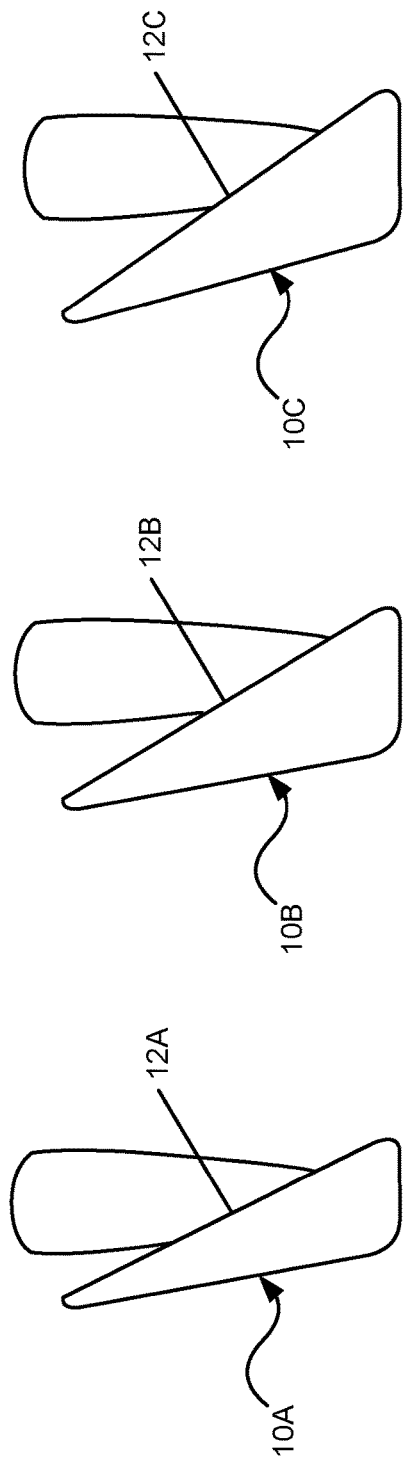
FIG. 15A-15F is a schematic view of an illustrative embodiment of a set of iron-type golf club heads, with the heads labeled FIG. 15A-15F in sequential order of increasing loft angle.
Figures 15D, 15E, 15F:
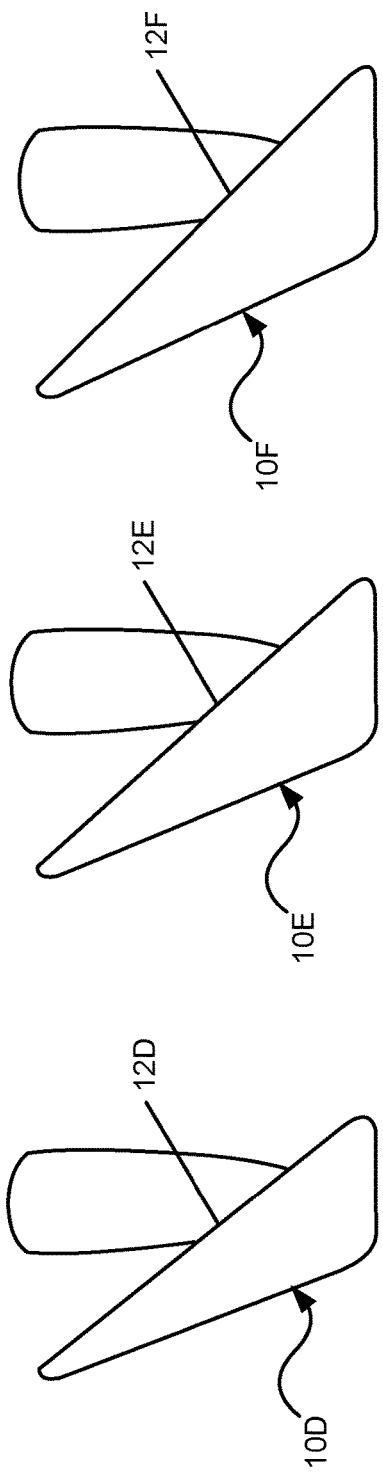

FIG. 14 illustrates another embodiment of a golf club head 602 that may utilize one or more of the various features described above. Many features of the head 602 of FIG. 14 are similar to the features of the head 102 shown in FIGS. 2-4, and such similar features are identified by similar reference numerals in FIG. 14 using the "6xx" series of reference numerals. Accordingly, certain features of the head 602 of FIG. 14 that are already described above may described below using less detail, or may not be described at all. In the embodiment shown in FIG. 14, the head 602 has a face member 640 with a plate-like configuration that includes the face 612, with no wall portions (e.g. 127) extending rearwardly from the face 612. The body member 642 is connected to the rear surface 641 of the face member 640, and forms a blade-type head 602 with a solid body 608 and no rear cavity. As with the embodiment shown in FIGS. 2-4, no specific connecting structure is shown in the embodiment of FIG. 14, however any of the connecting structures described herein may be used to connect the face and body members 640, 642 in this embodiment. Likewise, any of the materials and/or forming methods described herein, including the use of doping materials, may be incorporated into this embodiment. In one example structure, the more dense, doped material may be provided around the perimeter to provide at least some of the advantages of perimeter weighted irons while having the aesthetic appearance of blade type irons.

In further embodiments, features and techniques described herein, including the use of doped portions 144 may be utilized or incorporated within other types of golf club heads or other ball-striking devices. For example, these features can be used in a wood-type golf club, such as those shown in U.S. Pat. No. 7,993,216, which is hereby incorporated by reference herein in its entirety and made part hereof.

Several different embodiments have been described above, including the various embodiments of golf clubs 100 and heads 102, 102A-C, 202, 302, 402, 502, 602 and portions thereof described herein. It is understood that any of the features of these various embodiments may be combined and/or interchanged. For example, as described above, various different combinations of face members 140, et seq. with differently configured body members 142, et seq. may be used, including the configurations described herein, variations or combinations of such configurations, or other configurations. Any of the face members 140, et seq. and the body members 142, et seq. described herein can be used in combination, although some such combinations may require modification from the depicted structures. As another example, any of the various doping materials and configurations, connecting structures, materials, and forming methods described herein can be used with any other embodiment described herein, or variations thereof. In further embodiments, at least some of the features described herein can be used in connection with other configurations of iron-type clubs, wood-type clubs, other golf clubs, or other types of ball-striking devices.

Heads 102, et seq. incorporating the features disclosed herein may be used as a ball striking device or a part thereof. For example, a golf club 100 as shown in FIG. 1 may be manufactured by attaching a shaft or handle 104 to a head that is provided, such as the head 102 as described above. "Providing" the head, as used herein, refers broadly to making an article available or accessible for future actions to be performed on the article, and does not connote that the party providing the article has manufactured, produced, or supplied the article or that the party providing the article has ownership or control of the article. In other embodiments, different types of ball striking devices can be manufactured according to the principles described herein. In one embodiment, a set of golf clubs can be manufactured, where at least one of the clubs has a head according to one or more embodiments described herein.

A set of golf clubs 100 as described above may contain a series of heads 10A-F (FIGS. 15A-15F), each having a ball striking face 12A-F (FIGS. 15A-15F) with progressively increasing loft angles. In the embodiment illustrated, the set includes six golf club heads 10A-F (FIGS. 15A-15F), with the faces 12A-F (FIGS. 15A-15F) increasing in loft angle in sequence by approximately 5° increments, from about 20° to about 45°, such that the loft angle of each of the heads 10A-F is about 5° greater than the previous head 10A-F in the sequence. In other words, the heads 10A (FIG. 15A), 10B (FIG. 15B), 10C (FIG. 15C), 10D (FIG. 15D), 10E (FIG. 15E), and 10F (FIG. 15F) have faces 12A-F (FIG. 15A-15F) that have loft angles of about 20°, 25°, 30°, 35°, 40°, and 45°, respectively. A typical set of golf clubs 100 has seven clubs 100 with loft angles increasing from about 19° to about 45°, and thus, has one additional golf club 100 compared to the set illustrated in FIG. 15A-15F. By reducing the number of clubs 100 in the set, the cost of producing the entire set is reduced. Accordingly, if more expensive techniques and/or materials are used to produce a set of clubs, the set can be produced at a more competitive cost. This may be advantageous, as at least some embodiments described herein may incorporate more costly techniques and/or materials in production. It is understood that the set may have at least one additional club 100, such as a pitching wedge, a sand wedge, a gap wedge, a lob wedge, and/or another longer or shorter iron club, and may also be provided with one or more clubs of a different type, such as a wood and/or a putter.

Figure 16:
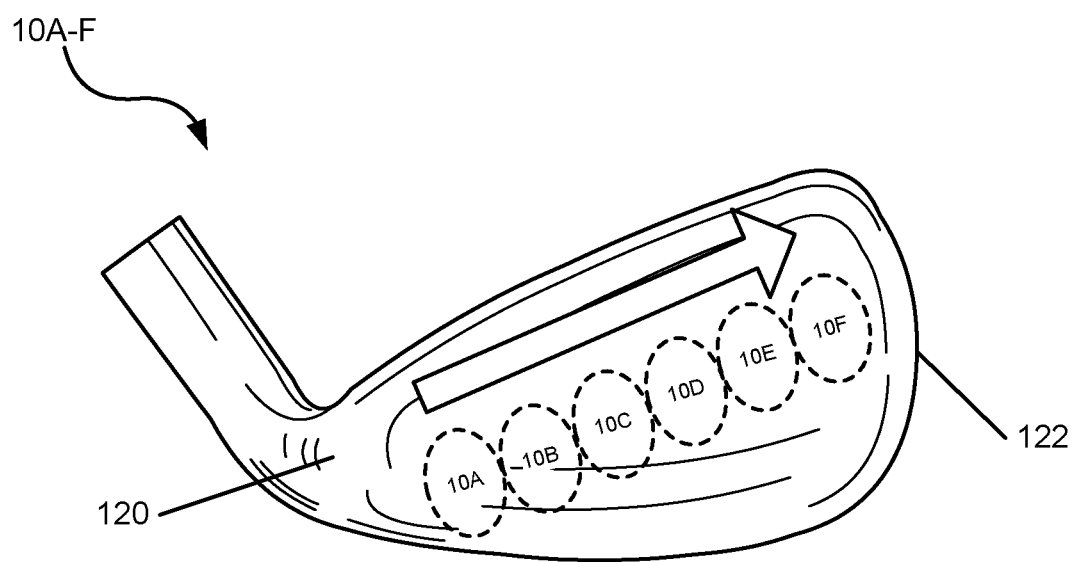
FIG. 16 is a schematic view of an iron-type club head, illustrating changes in position of a doped portion for club heads corresponding to the set of FIG. 15A-15F.

A set of golf clubs 100 as described above may also be configured with progressive weighting, such as the set of golf clubs shown in FIG. 15A-15F. For example, at least one of the six heads 10A-F may have the doped portion located in a different location relative to the doped portion of at least one other of the six heads 10A-F (FIGS. 15A-15F). In another example, each of the six heads 10A-F has the doped portion located in a different location relative to the doped portions of each of the other heads 10A-F. In one embodiment, described with respect to a head 102 configured as shown in FIGS. 2-4, the weighting of the club head 102 may be adjusted so that the position of the center of gravity may be progressively moved from heel 120 toward the toe 122 as the club heads 102 progress from longer to shorter irons. Likewise, the position of the center of gravity of the head 102 can be adjusted upward or downward as desired. In one example, the center of gravity may be lower on longer irons, in order to better facilitate getting the ball airborne, and may be higher on shorter irons, in order to achieve greater control. FIG. 16 schematically illustrates one embodiment of this progressive weighting, with respect to the set of club heads 10A-F shown in FIG. 15A-15F, illustrating the doped portion 144 being located lower and more toward the heel 120 in the longest iron head 10A and moving higher and toward the toe 122 as the irons progress from long to short (i.e., 10A-10B-10C-10D-10E-10F). In another example embodiment, various body members 142, et seq. with doped portions 144 as described above can be used to customize one or more golf clubs, or even a set of golf clubs, for a particular golfer, based on swing characteristics of the golfer for a particular club or clubs. For example, if a golfer has trouble closing the face while swinging a particular iron, more weight may be added to the heel 120, et seq. of that club head 102, et seq. As another example, the weighting of the head 102, et seq. may be adjusted to compensate for a common hitting pattern, such as if a golfer frequently strikes the ball in a specific location on the face 112, et seq. In further embodiments, still other types of progressive weighting can be utilized.

Additionally, as described above, the head 102, et seq., golf club 100, or other ball striking device may be fitted or customized for a person by custom fitting, which may include selecting a specific body member 142, et seq., with desired weighting characteristics and connecting the body member 142, et seq., to a selected face member 140, et seq. Further, in one embodiment, the body member 142, et seq., may be removable from the face member 140, et seq. In this configuration, the head 102, et seq., may be further customizable by removing one body member 142, et seq., and interchanging it with another body member 142, et seq., with a different shape, weighting configuration, or other characteristic. Various other different configurations are possible, and various other club heads may be designed for various performance characteristics.

Figure 17:
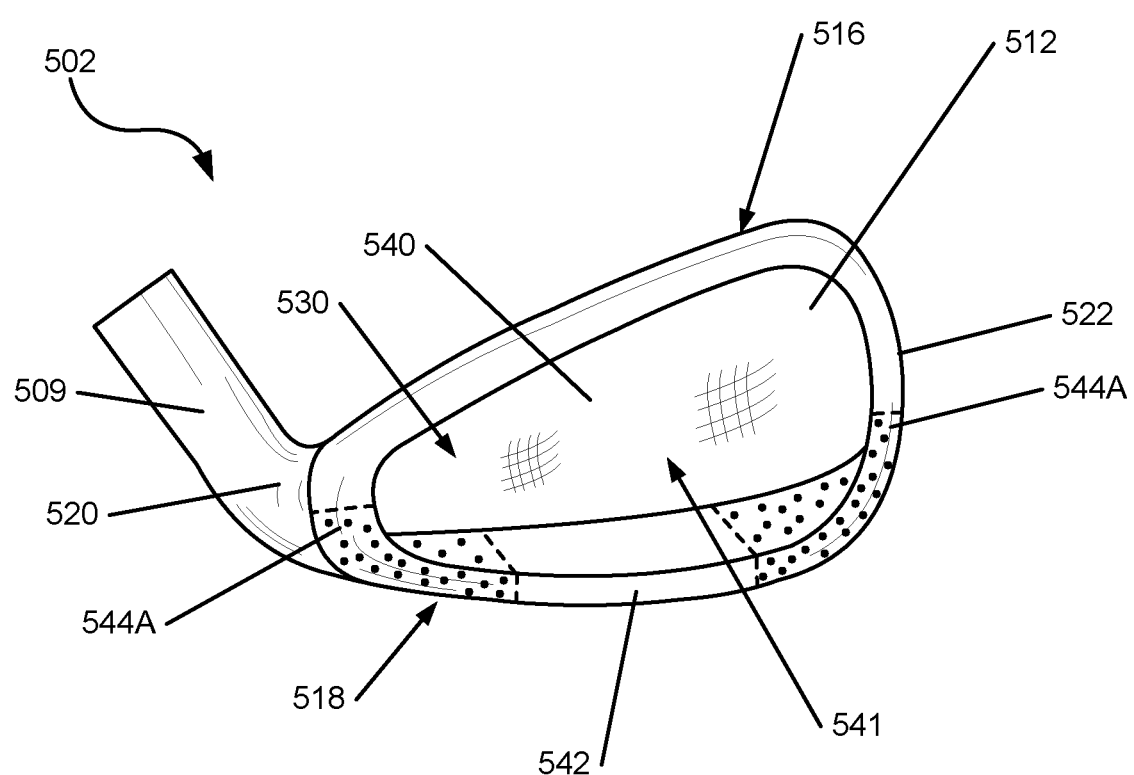
FIG. 17 is a rear view of one embodiment of the iron-type ball striking head of FIGS. 12 and 13.
Figure 18:
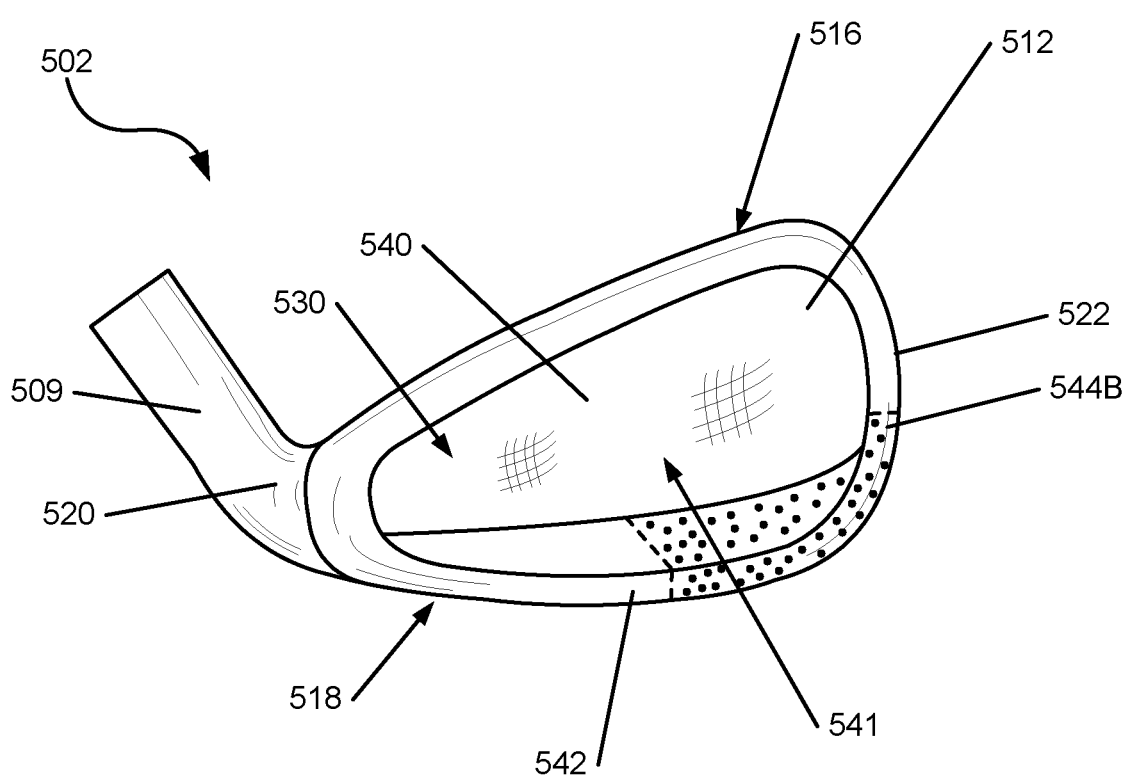
FIG. 18 is a rear view of another embodiment of the iron-type ball striking head of FIGS. 12 and 13.
Figure 19:
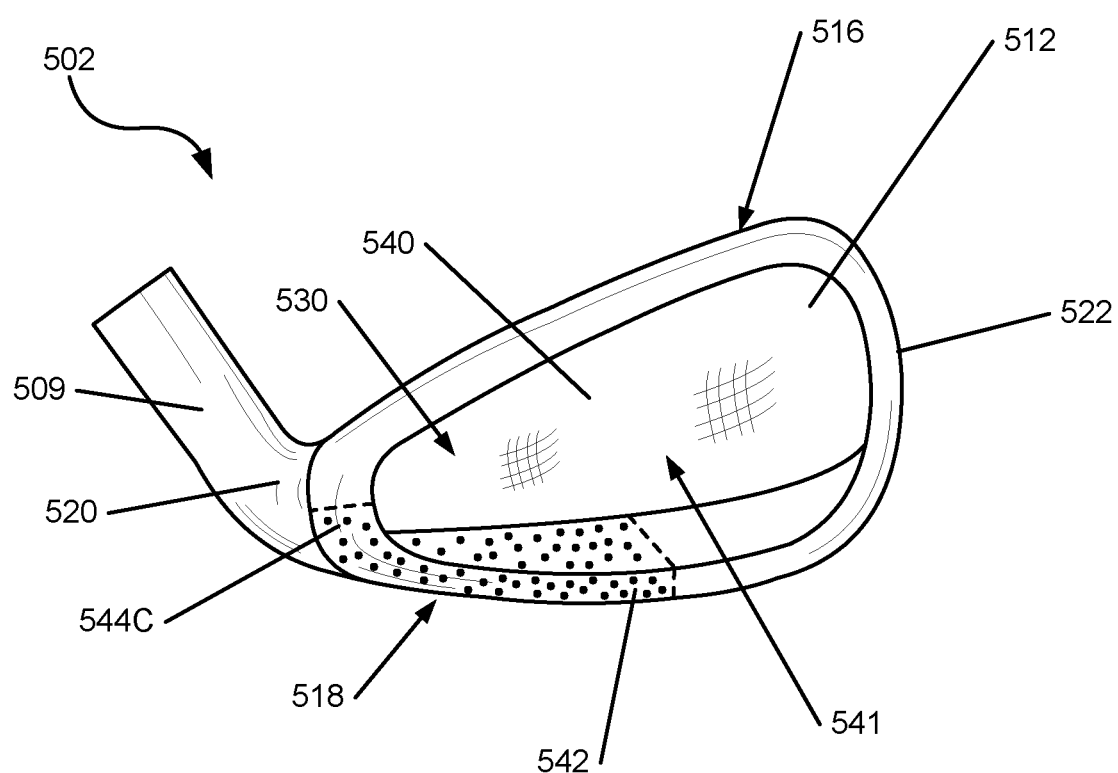
FIG. 19 is a of a further embodiment of the iron-type ball striking head of FIGS. 12 and 13.

Further, heads 102, et seq., as shown and described herein may include the doping material and the doped portion(s) 144 in any position or configuration. For example, as described above, lateral portions (e.g. heel 120 and/or toe 122 portions) of the heads 102, et seq., may include doped portions. FIGS. 17-19 illustrate examples of such embodiments. As shown in FIG. 17, the head 502 includes doped portions 544A that form the outer perimeter portions of the sole 518 and the lower portions of the heel 520 and toe 522. This creates a weighting configuration that lowers the center of gravity and increases the moment of inertia of the club head 502. The head 502 shown in FIG. 18 includes a doped portion 544B that forms the portions of the sole 518 located toward the toe 522, as well as the lower portions of the toe 522. This creates a weighting configuration that moves the center of gravity lower and toward the toe 522. The head 502 shown in FIG. 19 includes a doped portion 544C that forms the portions of the sole 518 located toward the heel 520, as well as the lower portions of the heel 520. This creates a weighting configuration that moves the center of gravity lower and toward the heel 520. In other embodiments, other configurations can be used to achieve different weighting configurations, and in further embodiments, similar configurations can be used with other club heads. As another example, the doped portion(s) 144 may form a larger proportion of the club head 102, et seq., and in one embodiment, the majority of the body member 142, et seq., may contain the doping material, and weighting characteristics may instead be controlled by adjusting the positions of the non-doped portions.

The ball striking devices and heads therefor as described herein provide many benefits and advantages over existing products. For example, the use of the doping material in specific locations on a club head can be used to control the weighting of the club head, including the weight, weight distribution, moment of inertia, etc. This permits club head designers to manipulate the weighting and weight distribution (including COG, MOI, etc.) within the framework of a typical club design, which can reduce or eliminate the need to use a radical geometry. As one example, a standard blade-type iron configuration can be manufactured with a number of different weighting configurations without significant changes in geometry. Additionally, weighted body members 142, et seq., as described herein can be used with a set of golf clubs to create progressive weighting or customized weighting among the clubs of the set. Further, the reduction in the number of clubs in a set may permit more expensive techniques and/or materials to be used in production, while maintaining the ability to offer the set at a reasonable price. Still further benefits and advantages may be recognizable by those skilled in the art.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. An iron-type golf club head comprising
a face member comprising a hosel, a substantially flat ball striking surface configured for striking a ball defined by a plurality of peripheral edges, and a peripheral wall extending rearwardly from a portion of the plurality of peripheral edges of the face member;
a body member connected to at least a portion of the peripheral wall of the face member, wherein the body member is formed at least partially of a polymer material, and wherein the body member extends from a heel side of the peripheral wall of the face member to a toe side of the peripheral wall of the face member;
wherein the face member and the body member define a hollow internal cavity;
wherein a portion of the hollow internal cavity comprises a doped portion located within the hollow internal cavity;
wherein the doping material has a different density than the polymer material of the body member; and
wherein the doped portion is located only in a lower portion of the hollow internal cavity.

2. The iron-type golf club head of claim 1, wherein the peripheral wall of the face member extends rearwardly around all the plurality of peripheral edges of the face member.

3. The iron-type golf club head of claim 2, wherein the body member is connected around the entire peripheral wall.

4. The iron-type golf club head of claim 1, wherein the entire body member contains a fiber reinforcing element.

5. The iron-type golf club head of claim 1, wherein the polymer material of the body has a higher density than the doped portion.

6. The iron-type golf club head of claim 1, wherein the face member is formed at least partially of a polymer material.

7. An iron-type golf club head comprising
a face member comprising a hosel, a substantially flat ball striking surface configured for striking a ball defined by a plurality of peripheral edges, and a peripheral wall extending rearwardly from a portion of the plurality of peripheral edges of the face member, and wherein the face has a loft angle of about 20 degrees to about 65 degrees;
a body member connected to at least a portion of the peripheral wall of the face member, wherein the body member is formed at least partially of a polymer material, and wherein the body member extends from a heel side of the peripheral wall of the face member to a toe side of the peripheral wall of the face member;
wherein the face member and the body member define a hollow internal cavity;
wherein a portion of the hollow internal cavity comprises a doped portion located within the hollow internal cavity;
wherein the doping material has a different density than the polymer material of the body member; and
wherein the doped portion is located only in a lower portion of the hollow internal cavity.

8. The iron-type golf club head of claim 7, wherein the peripheral wall of the face member extends rearwardly around all the plurality of peripheral edges of the face member.

9. The iron-type golf club head of claim 8, wherein the body member is connected around the entire peripheral wall.

10. The iron-type golf club head of claim 7, wherein the entire body member contains a fiber reinforcing element.

11. The iron-type golf club head of claim 7, wherein the polymer material of the body has a higher density than the doped portion.

12. The iron-type golf club head of claim 7, wherein the face member is formed at least partially of a polymer material.

13. The iron-type golf club head of claim 7, wherein the density of the doped portion is approximately 1.2 g/cc.

14. The iron-type golf club head of claim 7, wherein the density of the doped portion is 12.0 g/cc.

15. The iron-type golf club head of claim 7, wherein the peripheral wall extends rearwardly from the portion of the plurality edges of the face member to form a portion of a sole.

* * * * *